(12) United States Patent
Yoshimura et al.

(10) Patent No.: US 10,144,801 B2
(45) Date of Patent: Dec. 4, 2018

(54) POLYESTER RESIN, INJECTION-MOLDED ARTICLE, POLYESTER SHEET AND POLYESTER CONTAINER

(71) Applicant: MITSUBISHI GAS CHEMICAL COMPANY, INC., Tokyo (JP)

(72) Inventors: Yasuaki Yoshimura, Kanagawa (JP);
Takeshi Hirokane, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 69 days.

(21) Appl. No.: 15/026,746

(22) PCT Filed: Oct. 10, 2014

(86) PCT No.: PCT/JP2014/077178
§ 371 (c)(1),
(2) Date: Apr. 1, 2016

(87) PCT Pub. No.: WO2015/053389
PCT Pub. Date: Apr. 16, 2015

(65) Prior Publication Data
US 2016/0229951 A1    Aug. 11, 2016

(30) Foreign Application Priority Data

Oct. 11, 2013 (JP) ................. 2013-213322
Oct. 11, 2013 (JP) ................. 2013-213323
Oct. 11, 2013 (JP) ................. 2013-213324
Oct. 11, 2013 (JP) ................. 2013-213325

(51) Int. Cl.
| | | |
|---|---|---|
| *C08G 63/199* | (2006.01) | |
| *B29C 45/00* | (2006.01) | |
| *C08J 5/18* | (2006.01) | |
| *B29K 33/04* | (2006.01) | |
| *B29L 31/00* | (2006.01) | |

(52) U.S. Cl.
CPC ........ *C08G 63/199* (2013.01); *B29C 45/0001* (2013.01); *C08J 5/18* (2013.01); *B29K 2033/04* (2013.01); *B29L 2031/712* (2013.01); *C08J 2367/02* (2013.01); *Y02P 20/582* (2015.11)

(58) Field of Classification Search
CPC .. C08G 64/1608; C08G 63/199; C08G 64/06; C08G 18/2825; C08G 18/758; C08G 63/189; C08G 64/0208; C08L 69/00; C08L 67/02; C08L 83/00; C08L 83/08; C08L 2666/14; C08L 75/04; C08L 63/10; B29C 45/0001; B29K 2033/04; B29L 2031/712; C08J 2367/02; C08J 5/18; Y02P 20/582
See application file for complete search history.

(56) References Cited

U.S. PATENT DOCUMENTS

2013/0321934 A1    12/2013  Minezaki et al.
2014/0370219 A1    12/2014  Ogawa et al.

FOREIGN PATENT DOCUMENTS

| CN | 103298851 | 9/2013 |
|---|---|---|
| JP | 58-174419 | * 10/1983 |
| JP | S 63-260490 | * 10/1988 |
| JP | H08-127642 A | 5/1996 |
| JP | 2003-119259 | 4/2003 |
| JP | 2007-238856 | 9/2007 |
| JP | 2013-227384 | 11/2013 |
| WO | 2012-077700 | 6/2012 |
| WO | 2013/051686 | 4/2013 |

OTHER PUBLICATIONS

International Search Report issued in Patent Application No. PCT/JP2014/077178, dated Dec. 16, 2014.
International Preliminary Report on Patentability issued in Patent Application No. PCT/JP2014/077178, dated Apr. 12, 2016.

* cited by examiner

*Primary Examiner* — Ling Siu Choi
(74) *Attorney, Agent, or Firm* — Greenblum & Bernstein, P.L.C.

(57) ABSTRACT

The polyester resin according to the present invention is a polyester resin containing a diol unit and a dicarboxylic acid unit, wherein 50 to 95% by mol of the diol unit is a unit derived from pentacyclopentadecane dimethanol represented by a predetermined formula (I) and/or a unit derived from pentacyclopentadecane dimethanol represented by a predetermined formula (II), 50 to 100% by mol of the dicarboxylic acid unit is a unit derived from an aromatic dicarboxylic acid, and both of predetermined conditions (1) and (2) are satisfied.

17 Claims, 5 Drawing Sheets

[FIG. 1]
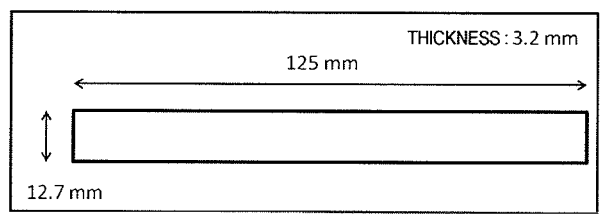

[FIG. 2]
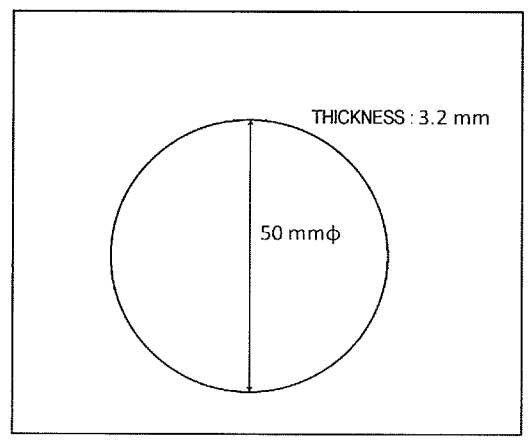

[FIG. 3]
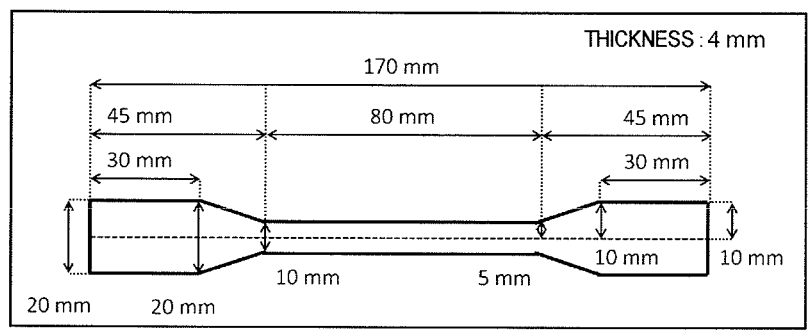

[FIG. 4]
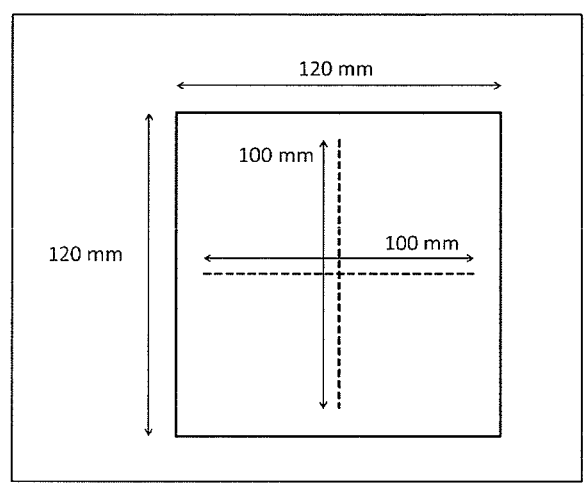

[FIG. 5]
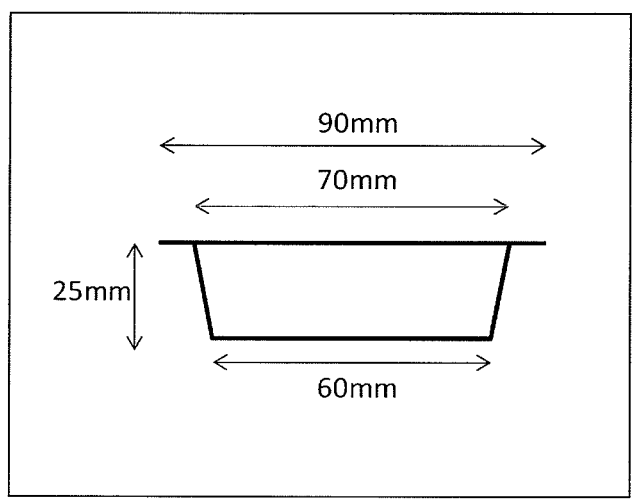

POLYESTER RESIN, INJECTION-MOLDED ARTICLE, POLYESTER SHEET AND POLYESTER CONTAINER

TECHNICAL FIELD

The present invention relates to a polyester resin obtained by copolymerization of a specific diol having a pentacyclopentadecane backbone, and an injection-molded article, a polyester sheet and a polyester container using the same.

BACKGROUND ART

Polyethylene terephthalate (hereinafter, sometimes abbreviated as "PET".) is a polyester resin widely used for sheets, films, containers and the like because of having characteristics such as excellent transparency, mechanical strength, chemical resistance and recyclability.

In particular, a PET transparent molded article produced by injection molding is highly in demand in applications such as sundries and containers because of being excellent in functionalities such as lightness and impact resistance and also being large in the degree of freedom of shape design.

In addition, a PET transparent sheet is increased in demand in the food field because of having the advantages of being excellent in environmental compatibility, for example, generating no dioxin in incineration, being recyclable, and generating no environmental hormone.

Furthermore, a PET transparent container is increased in demand in the food field and the toiletry field because of having the advantages of being excellent in functionalities such as lightness, ease of handling and identifiability of contents, and in environmental compatibility, for example, generating no dioxin in incineration and being recyclable.

PET, however, has a glass transition temperature of about 80° C., and therefore is not sufficiently high in heat resistance and cannot be utilized as a material that can be applied to high-temperature sterilization like boiling disinfection, cooking in a microwave oven, and the like. In addition, for example, when a thick molded article is obtained and when a sheet is subjected to secondary molding to provide a molded article, high crystallinity may cause whitening to progress, thereby impairing transparency. Therefore, modification by copolymerization has been widely performed.

As an example of the modification, an amorphous polyester resin has been proposed in which PET is copolymerized with isophthalic acid or copolymerized with 1,4-cyclohexane dimethanol to result in a reduction in crystallinity, thereby reducing the problem of whitening of a molded article. Such a resin, however, has a glass transition temperature of below 100° C., and is not almost improved in terms of heat resistance.

Polyethylene naphtha late (hereinafter, sometimes abbreviated as "PEN".) has been utilized in the above application where heat resistance is required, but is equivalent to PET in crystallinity, and therefore may be impaired in terms of transparency in the case of being formed into a thick molded article.

As another example of the modification by copolymerization, Patent Documents 1 and 2 disclose a polyester resin obtained by copolymerization of a diol having a pentacyclopentadecane backbone. In particular, Patent Document 1 describes a polyester resin in which a dicarboxylic acid unit is mainly a unit derived from an aliphatic dicarboxylic acid and a diol unit other than the diol having a pentacyclopentadecane backbone is a unit derived from an aliphatic diol. In addition, Patent Document 2 describes a polyester resin in which an aromatic dicarboxylic acid unit or an aliphatic dicarboxylic acid unit as a dicarboxylic acid unit, and a diol having a pentacyclopentadecane backbone as a diol unit are copolymerized.

CITATION LIST

Patent Document

Patent Document 1: Japanese Patent Application Laid-Open No. 2007-238856
Patent Document 2: Japanese Patent Application Laid-Open No. S58-174419

SUMMARY OF INVENTION

Technical Problem

The polyester resin described in Patent Document 1 has a glass transition temperature value of 130° C. or lower, and therefore has the problems of having difficulty in being applied to an application where high heat resistance is required, and of being not sufficient in transparency and mechanical strength depending on the composition of the resin.

The polyester resin obtained by copolymerization of the diol having a pentacyclopentadecane backbone, described in Patent Document 2, is rather reduced in heat resistance at a rate of copolymerization of more than 49% by mol, and a polyester resin, which can be used in an application where higher heat resistance is required, is demanded.

Thus, a polyester resin, which is suitable for an application where high heat resistance and low crystallinity are simultaneously required, has not been conventionally known.

In addition, Patent Document 1 and Patent Document 2 describe neither application of the polyester resin described in each of such Documents to production of a molded product by injection molding nor application of a molded article of the polyester resin to an application where high heat resistance is required, such as boiling disinfection.

Furthermore, Patent Document 1 and Patent Document 2 describe neither application of the polyester resin obtained by copolymerization of the diol having a pentacyclopentadecane backbone to production of a sheet and a molded article of the sheet, nor evaluation of transparency and heat resistance of the sheet.

Furthermore, Patent Document 1 and Patent Document 2 describe neither the applicability of the polyester resin obtained by copolymerization of the diol having a pentacyclopentadecane backbone to production of a container, nor evaluation of transparency and heat resistance of the container.

The present invention has been made in view of the above problems of the conventional techniques. That is, an object of the present invention is to provide a polyester resin having high heat resistance and also being excellent in transparency and mechanical properties, as well as an injection-molded article, a polyester sheet and a polyester container using the same.

Solution to Problem

The present inventors have made intensive studies, and as a result, have found that a polyester resin obtained by copolymerization of a specific diol having a pentacyclopentadecane backbone in a specific composition range has high heat resistance and is excellent in transparency and mechanical properties. Furthermore, they have found that an injection-molded article, a polyester sheet and a polyester container using the polyester resin have excellent transparency and mechanical properties, and also have more excellent heat resistance.

That is, the present invention is as follows.

[1] A polyester resin comprising a diol unit and a dicarboxylic acid unit, wherein
50 to 95% by mol of the diol unit is a unit derived from pentacyclopentadecane dimethanol represented by the following formula (I) and/or pentacyclopentadecane dimethanol represented by the following formula (II), 50 to 100% by mol of the dicarboxylic acid unit is a unit derived from an aromatic dicarboxylic acid, and both of the following conditions (1) and (2) are satisfied:
(1) a measurement value of a glass transition temperature measured by a differential scanning calorimeter is 131° C. or higher, and an amount of heat of a crystallization exothermic peak in temperature drop is 5 J/g or less; and
(2) a measurement value of an intrinsic viscosity (IV) at 25° C. using a mixed solvent of phenol and 1,1,2,2-tetrachloroethane in a mass ratio of 6:4 is 0.2 to 1.2 dl/g.

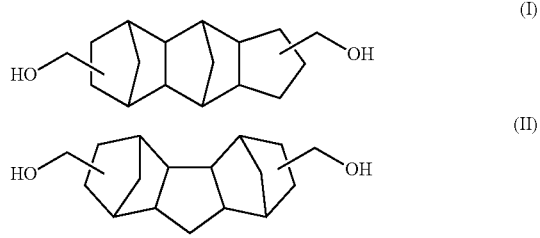

[2] The polyester resin according to [1], wherein the unit derived from the aromatic dicarboxylic acid is a unit derived from at least one selected from the group consisting of terephthalic acid, isophthalic acid and 2,6-naphthalenedicarboxylic acid.
[3] The polyester resin according to [1] or [2], wherein 80 to 100% by mol of the dicarboxylic acid unit is the unit derived from the aromatic dicarboxylic acid.
[4] The polyester resin according to any of [1] to [3], comprising 5 to 50% by mol of a unit derived from ethylene glycol as the diol unit.
[5] An injection-molded article obtained from a polyester resin comprising a diol unit and a dicarboxylic acid unit, wherein
50 to 95% by mol of the diol unit of the polyester resin is a unit derived from pentacyclopentadecane dimethanol represented by the following formula (I) and/or pentacyclopentadecane dimethanol represented by the following formula (II), 50 to 100% by mol of the dicarboxylic acid unit of the polyester resin is a unit derived from an aromatic dicarboxylic acid, and the polyester resin satisfies the following conditions (1) and (2):
(1) a measurement value of a glass transition temperature measured by a differential scanning calorimeter is 131° C. or higher, and an amount of heat of a crystallization exothermic peak in temperature drop is 5 J/g or less; and
(2) a measurement value of an intrinsic viscosity (IV) at 25° C. using a mixed solvent of phenol and 1,1,2,2-tetrachloroethane in a mass ratio of 6:4 is 0.2 to 1.2 dl/g.

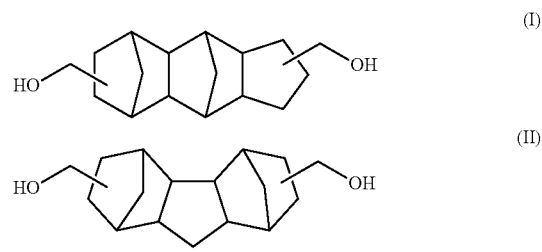

[6] The injection-molded article according to [5], wherein the unit derived from the aromatic dicarboxylic acid of the polyester resin is a unit derived from at least one selected from the group consisting of terephthalic acid, isophthalic acid and 2,6-naphthalenedicarboxylic acid.
[7] The injection-molded article according to [5] or [6], wherein 80 to 100% by mol of the dicarboxylic acid unit of the polyester resin is the unit derived from the aromatic dicarboxylic acid.
[8] The injection-molded article according to any of [5] to [7], comprising 5 to 50% by mol of a unit derived from ethylene glycol as the diol unit of the polyester resin.
[9] The injection-molded article according to any of [5] to [8], wherein 50 to 90% by mol of the diol unit of the polyester resin is the unit derived from the pentacyclopentadecane dimethanol represented by the formula (I) and/or the pentacyclopentadecane dimethanol represented by the formula (II), 10 to 50% by mol of the diol unit of the polyester resin is a unit derived from ethylene glycol, and 70 to 100% by mol of the dicarboxylic acid unit of the polyester resin is a unit derived from terephthalic acid.
[10] The injection-molded article according to any of [5] to [8], wherein 5 to 50% by mol of the diol unit of the polyester resin is a unit derived from ethylene glycol, and 70 to 100% by mol of the dicarboxylic acid unit of the polyester resin is a unit derived from 2,6-naphthalenedicarboxylic acid.
[11] The injection-molded article according to any of [5] to [10], wherein the polyester resin satisfies the following condition (3):
(3) when a test piece (1A type multi-purpose test piece) having a shape described in JIS K7162 (tensile property testing method), obtained by subjecting the polyester resin to injection molding, is immersed in boiling water at 100° C. for 30 minutes, a rate of dimensional change after immersion in boiling water, calculated from the following formula (1), is 0.50% or less in each of a thickness direction and a width direction, and 0.60% or less in an entire length direction:

$$\Delta M = |M - M_0|/M_0 \times 100 \qquad \text{Formula (1)}$$

wherein $\Delta M$ represents the rate of dimensional change [%], $M_0$ represents a dimension before immersion in boiling water [mm], and M represents a dimension after immersion in boiling water [mm].
[12] A polyester sheet obtained by subjecting a polyester resin comprising a diol unit and a dicarboxylic acid unit to molding, wherein
50 to 95% by mol of the diol unit of the polyester resin is a unit derived from pentacyclopentadecane dimethanol represented by the following formula (I) and/or pentacyclopentadecane dimethanol represented by the following formula (II), 50 to 100% by mol of the dicarboxylic acid unit of the polyester resin is a unit derived from an aromatic dicarboxylic acid, and the polyester resin the following conditions (1) and (2):

(1) a measurement value of a glass transition temperature of the polyester resin, measured by a differential scanning calorimeter, is 131° C. or higher, and an amount of heat of a crystallization exothermic peak in temperature drop is 5 J/g or less; and (2) a measurement value of an intrinsic viscosity (IV) at 25° C. of the polyester resin, using a mixed solvent of phenol and 1,1,2,2-tetrachloroethane in a mass ratio of 6:4, is 0.2 to 1.2 dl/g.

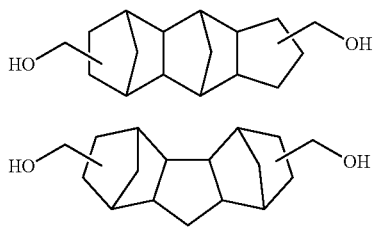

[13] The polyester sheet according to [12], wherein the unit derived from the aromatic dicarboxylic acid of the polyester resin is a unit derived from at least one selected from the group consisting of terephthalic acid, isophthalic acid and naphthalenedicarboxylic acid.

[14] The polyester sheet according to [12] or [13], wherein 80 to 100% by mol of the dicarboxylic acid unit of the polyester resin is the unit derived from the aromatic dicarboxylic acid.

[15] The polyester sheet according to any of [12] to [14], comprising 5 to 50% by mol of a unit derived from ethylene glycol as the diol unit of the polyester resin.

[16] The polyester sheet according to any of [12] to [15], wherein 50 to 90% by mol of the diol unit of the polyester resin is the unit derived from the pentacyclopentadecane dimethanol represented by the formula (I) and/or the pentacyclopentadecane dimethanol represented by the formula (II), 10 to 50% by mol of the diol unit of the polyester resin is a unit derived from ethylene glycol, and 70 to 100% by mol of the dicarboxylic acid unit of the polyester resin is a unit derived from terephthalic acid.

[17] The polyester sheet according to any of [12] to [15], wherein 5 to 50% by mol of the diol unit of the polyester resin is a unit derived from ethylene glycol, and 70 to 100% by mol of the dicarboxylic acid unit of the polyester resin is a unit derived from 2,6-naphthalenedicarboxylic acid.

[18] The polyester sheet according to any of [12] to [17], wherein the polyester resin satisfies the following conditions (4) and (5):

(4) a measurement value of a total light transmittance of each of a sheet having a thickness of 0.20 mm and a sheet having a thickness of 0.35 mm is 86% or more; and (5) when a square test piece of a size of 120 mm in longitudinal length×120 mm in lateral width, where an extrusion direction is defined as a longitudinal direction and a width direction is defined as a lateral direction, is cut out from the sheet having a thickness of 0.20 mm and a marked line having a length of 100 mm is signed on a center line in each of the longitudinal direction and the lateral direction of the test piece, and the test piece is heated in a dryer for 30 minutes, a maximum temperature (heat resistance temperature), at which a rate of change in the marked line length after heating, calculated from the following formula (2), is not more than 0.5% in each of the longitudinal length and the lateral width, is 110° C. or higher:

$$\Delta L = |L - L_0| / L_0 \times 100 \qquad \text{Formula (2)}$$

wherein $\Delta L$ represents the rate of change in the marked line length [%], $L_0$ represents a marked line length before heating [mm], and L represents a marked line length after heating [mm].

[19] A polyester container obtained by subjecting a polyester resin comprising a diol unit and a dicarboxylic acid unit to molding, wherein 50 to 95% by mol of the diol unit of the polyester resin is a unit derived from pentacyclopentadecane dimethanol represented by the following formula (I) and/or pentacyclopentadecane dimethanol represented by the following formula (II), 50 to 100% by mol of the dicarboxylic acid unit of the polyester resin is a unit derived from an aromatic dicarboxylic acid, and the polyester resin satisfies the following conditions (1) and (2):

(1) a measurement value of a glass transition temperature of the polyester resin, measured by a differential scanning calorimeter, is 131° C. or higher, and an amount of heat of a crystallization exothermic peak in temperature drop is 5 J/g or less; and (2) a measurement value of an intrinsic viscosity (IV) at 25° C. of the polyester resin, using a mixed solvent of phenol and 1,1,2,2-tetrachloroethane in a mass ratio of 6:4, is 0.2 to 1.2 dl/g.

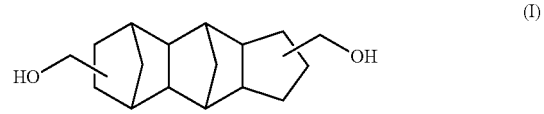

[20] The polyester container according to [19], wherein the unit derived from the aromatic dicarboxylic acid of the polyester resin is a unit derived from at least one selected from the group consisting of terephthalic acid, isophthalic acid and naphthalenedicarboxylic acid.

[21] The polyester container according to [19] or [20], wherein 80 to 100% by mol of the dicarboxylic acid unit of the polyester resin is the unit derived from the aromatic dicarboxylic acid.

[22] The polyester container according to any of [19] to [21], comprising 5 to 50% by mol of a unit derived from ethylene glycol as the diol unit of the polyester resin.

[23] The polyester container according to any of [19] to [22], wherein 50 to 90% by mol of the diol unit of the polyester resin is the unit derived from the pentacyclopentadecane dimethanol represented by the formula (I) and/or the pentacyclopentadecane dimethanol represented by the formula (II), 10 to 50% by mol of the dial unit of the polyester resin is a unit derived from ethylene glycol, and 70 to 100% by mol of the dicarboxylic acid unit of the polyester resin is a unit derived from terephthalic acid.

[24] The polyester container according to any of [19] to [22], wherein 5 to 50% by mol of the diol unit of the polyester resin is a unit derived from ethylene glycol, and 70 to 100% by mol of the dicarboxylic acid unit of the polyester resin is a unit derived from 2,6-naphthalenedicarboxylic acid.

[25] The polyester container according to any of [19] to [24], wherein the polyester container satisfies the following condition (6):

(6) when a polyester container having the following shape is heated in a dryer for 30 minutes, a maximum temperature (heat resistance temperature), at which a height retention rate of a container after heating, calculated from the following formula (3), is 98% or more, is 100° C. or higher:

<Shape of Container> a container having an opening of 70 mm×70 mm, a height of 25 mm and a volume of about 100 mL, obtained by subjecting a polyester sheet having a thickness of 0.35 mm to thermal molding at a drawing ratio of 0.36 by use of a compressed air vacuum molding machine;

$$\Delta H = H/H_0 \times 100 \qquad \text{<Formula (3)>}$$

wherein ΔH represents the height retention rate of the container [%], $H_0$ represents a height of the container before heating [mm], and H represents a height of the container after heating [mm].

[26] The polyester container according to any of [19] to [25], wherein the molding is hollow molding of the polyester resin.

[27] The polyester container according to any of [19] to [25], wherein the molding is thermal molding of a sheet comprising the polyester resin.

Advantageous Effects of Invention

The polyester resin of the present invention has excellent transparency and mechanical properties, and also has more excellent heat resistance. Furthermore, the injection-molded article, the polyester sheet and the polyester container of the present invention have excellent transparency and mechanical properties, and also have more excellent heat resistance.

BRIEF DESCRIPTION OF DRAWINGS

FIG. 1 is a view illustrating the shape and the dimension of a test piece (reed-shaped injection-molded article) for use in measurement of the deflection temperature under load of a molded article.

FIG. 2 is a view illustrating the shape and the dimension of a test piece (disc-shaped injection-molded article) for use in measurement of the transparency of a molded article.

FIG. 3 is a view illustrating the shape and the dimension of a test piece (1A type multi-purpose test piece described in the tensile property testing method according to JIS K7162) for use in measurement of the boiling resistance of a molded article.

FIG. 4 is a view illustrating the dimension and the marked line distance (marked line length) of a test piece for use in evaluation of the heat resistance of a sheet.

FIG. 5 is a view illustrating the cross-sectional shape and the dimension of a molded article for use in measurement of the heat resistance temperature of a container.

DESCRIPTION OF EMBODIMENTS

Hereinafter, an embodiment for carrying out the present invention (hereinafter, simply referred to as "present embodiment".) is described in detail. The following present embodiment is illustrative for explaining the present invention, and is not construed as limiting the present invention to the following content. The present invention can be appropriately modified and performed within the gist thereof.

<First Embodiment>

[Polyester Resin]

A polyester resin of the present embodiment is a polyester resin comprising a diol unit and a dicarboxylic acid unit. Furthermore, in the polyester resin of the present embodiment, 50 to 95% by mol of the diol unit is a unit derived from pentacyclopentadecane dimethanol represented by the following formula (I) and/or pentacyclopentadecane dimethanol represented by the following formula (II), 50 to 100% by mol of the dicarboxylic acid unit is a unit derived from an aromatic dicarboxylic acid, and both of the following conditions (1) and (2) are satisfied:

(1) the measurement value of the glass transition temperature measured by a differential scanning calorimeter is 131° C. or higher, and the amount of heat of a crystallization exothermic peak in temperature drop is 5 J/g or less; and (2) the measurement value of the intrinsic viscosity (IV) at 25° C. using a mixed solvent of phenol and 1,1,2,2-tetrachloroethane in a mass ratio of 6:4 is 0.2 to 1.2 dl/g.

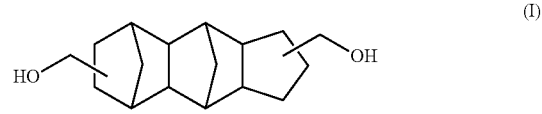

(I)

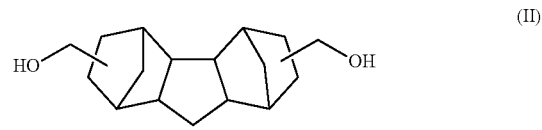

(II)

The polyester resin of the present embodiment is constituted as described above, and therefore has high heat resistance and is also excellent in transparency and mechanical properties. In particular, the polyester resin has high heat resistance and is also excellent in transparency and mechanical properties as compared with a conventionally known heat resistant transparent polyester resin and a general-purpose transparent resin such as polystyrene and an acrylonitrile-styrene copolymer. Therefore, the polyester resin of the present embodiment can be suitably utilized in various applications such as a food container, a cosmetic container, a medical instrument, an optical material, an automobile component, and baby products such as a baby bottle and a pacifier. Thus, the polyester resin of the present embodiment has extremely high industrial applicability.

In the present embodiment, the proportion of the unit derived from the pentacyclopentadecane dimethanol represented by the formula (I) and/or (II) is 50% by mol or more of the entire diol unit, preferably 51% by mol or more, more preferably 55% by mol or more, further preferably 60% by mol or more. When the proportion of the unit derived from the pentacyclopentadecane dimethanol is 50% by mol or more of the entire diol unit, the effect of increasing the glass transition temperature of the polyester resin, and the effect of suppressing crystallinity are sufficiently exerted. On the other hand, the proportion of the unit derived from the pentacyclopentadecane dimethanol is 95% by mol or less of the entire diol unit, preferably 90% by mol or less, more preferably 85% by mol or less, further preferably 80% by mol or less. When the proportion of the unit derived from the pentacyclopentadecane dimethanol is 95% by mol or less of the entire diol unit, the melt viscosity of the polyester resin is avoided from being remarkably high, a resin having a sufficient molecular weight is obtained in synthesis of the polyester resin by melt polymerization, and mechanical properties of a polyester container produced from such a resin are excellent. Furthermore, when the proportion is 95% by mol or less, the problem about moldability, for example, the problem of hardly performing sufficient transfer to a mold in injection molding can be prevented from being caused. In addition, molding can be performed at a proper preheating temperature of the resin in molding, and coloration of a molded article and a reduction in mechanical properties due to heat deterioration of the resin can be prevented.

Accordingly, the proportion of the unit derived from the pentacyclopentadecane dimethanol represented by the formula (I) and/or (II) is in the range from 50 to 95% by mol of the entire diol unit, preferably in the range from 50 to 90% by mol, more preferably in the range from 51 to 90% by mol, further preferably in the range from 51 to 85% by mol, still further preferably in the range from 55 to 85% by mol, furthermore preferably in the range from 55 to 80% by mol, still furthermore preferably in the range from 60 to 80% by mol. When the unit derived from the pentacyclopentadecane dimethanol is contained in the proportion in the above range, the glass transition temperature of the polyester resin is significantly increased and excellent heat resistance is achieved. Additionally, crystallinity is reduced, and transparency is not impaired even in molding of a thick molded article.

Specific examples of the pentacyclopentadecane dimethanol represented by the formula (I) include 4,10-bis(hydroxymethyl)pentacyclo[6.5.1.1$^{3,6}$.0$^{2,7}$.0$^{9,13}$]pentadecane, 4,11-bis(hydroxymethyl)pentacyclo[6.5.1.1$^{3,6}$.0$^{2,7}$.0$^{9,13}$]pentadecane, 4,12-bis(hydroxymethyl)pentacyclo[6.5.1.1$^{3,6}$.0$^{2,7}$.0$^{9,13}$]pentadecane, and stereoisomers thereof.

Specific examples of the pentacyclopentadecane dimethanol represented by the formula (II) include 5,12-bis(hydroxymethyl)pentacyclo[9.2.1.1$^{4,7}$.0$^{2,10}$.0$^{3,8}$]pentadecane, 5,13-bis(hydroxymethyl)pentacyclo[9.2.1.1$^{4,7}$.0$^{2,10}$.0$^{3,8}$]pentadecane, 6,12-bis(hydroxymethyl)pentacyclo[9.2.1.1$^{4,7}$.0$^{2,10}$.0$^{3,8}$]pentadecane, and stereoisomers thereof.

The above pentacyclopentadecane dimethanol may include a single compound or a plurality of compounds selected from these pentacyclopentadecane dimethanols.

The diol unit included in the polyester resin of the present embodiment may also include a diol unit other than the unit derived from the pentacyclopentadecane dimethanol. Examples of the diol unit other than the unit derived from the pentacyclopentadecane dimethanol can include, but not limited to the following, units derived from aliphatic diols, alicyclic diols, polyether compounds, bisphenols and alkylene oxide adducts thereof, and aromatic dihydroxy compounds and alkylene oxide adducts thereof.

Examples of the aliphatic diols include, but not limited to the following, ethylene glycol, trimethylene glycol, 1,4-butanediol, 1,5-pentanediol, 1,6-hexanediol, diethylene glycol, propylene glycol and neopentyl glycol. Examples of the alicyclic diols include, but not limited to the following, 1,3-cyclohexane dimethanol, 1,4-cyclohexane dimethanol, 1,3-decahydronaphthalene dimethanol, 1,4-decahydronaphthalene dimethanol, 1,5-decahydronaphthalene dimethanol, 1,6-decahydronaphthalene dimethanol, 2,6-decahydronaphthalene dimethanol, 2,7-decahydronaphthalene dimethanol, norbornane dimethanol, tricyclodecane dimethanol, 3,9-bis(1,1-dimethyl-2-hydroxyethyl)-2,4,8,10-tetraoxaspiro[5.5]undecane and 5-methylol-5-ethyl-2-(1,1-dimethyl-2-hydroxyethyl)-1,3-dioxane. Examples of the polyether compounds include, but not limited to the following, polyethylene glycol, polypropylene glycol and polybutylene glycol. Examples of the bisphenols include, but not limited to the following, 4,4'-(1-methylethylidene)bisphenol (bisphenol A), 4,4'-methylidenebisphenol (bisphenol F), 4,4'-cyclohexylidenebisphenol (bisphenol Z) and 4,4'-sulfonylbisphenol (bisphenol S). Examples of the aromatic dihydroxy compounds include, but not limited to the following, hydroquinone, resorcin, 4,4'-dihydroxybiphenyl, 4,4'-dihydroxydiphenyl ether and 4,4'-dihydroxydiphenyl benzophenone. These may be included as the diol unit singly or in combinations of two or more.

A unit derived from ethylene glycol, trimethylene glycol or 1,4-butanediol is more preferable and a unit derived from ethylene glycol is further preferable in terms of heat resistance and mechanical properties of the polyester resin as well as availability.

When the unit derived from ethylene glycol is contained as the diol unit other than the unit derived from the pentacyclopentadecane dimethanol, the proportion of the unit derived from ethylene glycol is preferably 1 to 50% by mol of the diol unit, more preferably 5 to 50% by mol, further preferably 10 to 50% by mol, still further preferably 15 to 49% by mol, particularly preferably 20 to 45% by mol, from the viewpoint of enhancements in heat resistance and mechanical properties of the polyester resin.

The polyester resin of the present embodiment contains a unit derived from an aromatic dicarboxylic acid as the dicarboxylic acid unit. The proportion of the unit derived from an aromatic dicarboxylic acid is 50 to 100% by mol of the entire dicarboxylic acid unit, preferably 80 to 100% by mol, more preferably 100% by mol.

The unit derived from an aromatic dicarboxylic acid is contained in the above proportion to thereby allow the polyester resin of the present embodiment to be excellent in heat resistance and mechanical properties.

Examples of the unit derived from an aromatic dicarboxylic acid can include, but not particularly limited, units derived from terephthalic acid, isophthalic acid, phthalic acid, 1,3-naphthalenedicarboxylic acid, 1,4-naphthalenedicarboxylic acid, 1,5-naphthalenedicarboxylic acid, 1,6-naphthalenedicarboxylic acid, 2,6-naphthalenedicarboxylic acid, 2,7-naphthalenedicarboxylic acid, 2-methylterephthalic acid, biphenyldicarboxylic acid and tetralindicarboxylic acid. These may be included as the dicarboxylic acid unit singly or in combinations of two or more, or may be used as an ester of such dicarboxylic acid and an alcohol having 1 to 6 carbon atoms.

A unit derived from terephthalic acid, isophthalic acid or 2,6-naphthalenedicarboxylic acid is preferable in terms of heat resistance and mechanical properties of the polyester resin as well as availability, and a unit derived from terephthalic acid or isophthalic acid is more preferable in terms of economic performance.

A dicarboxylic acid unit other than the unit derived from an aromatic dicarboxylic acid (unit derived from other dicarboxylic acid) in the dicarboxylic acid unit included in the polyester resin of the present embodiment is not particularly limited.

Examples of the unit derived from other dicarboxylic acid can include, but not limited to the following, units derived from aliphatic dicarboxylic acids and alicyclic dicarboxylic acids.

Examples of the aliphatic dicarboxylic acids include, but not limited to the following, succinic acid, glutaric acid, adipic acid, pimelic acid, suberic acid, azelaic acid, sebacic acid, decanedicarboxylic acid and dodecanedicarboxylic acid. Examples of the alicyclic dicarboxylic acids include, but not limited to the following, 1,3-cyclohexanedicarboxylic acid, 1,4-cyclohexanedicarboxylic acid, 1,3-decahydronaphthalenedicarboxylic acid, 1,4-decahydronaphthalenedicarboxylic acid, 1,5-decahydronaphthalenedicarboxylic acid, 1,6-decahydronaphthalenedicarboxylic acid, 2,6-decahydronaphthalenedicarboxylic acid, 2,7-decahydronaphthalenedicarboxylic acid, norbornanedicarboxylic acid, tricyclodecanedicarboxylic acid, pentacyclopentadecanedicarboxylic acid, 3,9-bis(1,1-dimethyl-2-carboxyethyl)-2,4,8,10-tetraoxaspiro[5.5]undecane and 5-carboxy-5-ethyl-2-(1,1-dimethyl-2-carboxyethyl)-1,3-dioxane. These may be included as the dicarboxylic acid unit singly or in combinations of two or more, or may be used as an ester of such dicarboxylic acid and an alcohol having 1 to 6 carbon atoms.

The polyester resin of the present embodiment may include a unit derived from a monoalcohol, a unit derived from a polyhydric alcohol, a unit derived from a monocarboxylic acid, a unit derived from a polyvalent carboxylic acid or a unit derived from an oxyacid in order to adjust melt viscoelasticity, molecular weight and the like as long as the object of the present embodiment is not impaired.

Examples of the monoalcohol include, but not limited to the following, butyl alcohol, hexyl alcohol and octyl alcohol. Examples of the polyhydric alcohol include, but not limited to the following, trimethylol propane, glycerin, 1,3,5-pentanetriol and pentaerythritol. Examples of the monocarboxylic acid include, but not limited to the following, benzoic acid, propionic acid and butyric acid. Examples of the polyvalent carboxylic acid include, but not limited to the following, trimellitic acid and pyromellitic acid. Examples of the oxyacid include, but not limited to the following, glycolic acid, lactic acid, hydroxybutyric acid, 2-hydroxyisobutyric acid and hydroxybenzoic acid.

The method for producing the polyester resin of the present embodiment is not particularly limited, and a conventionally known method for producing a polyester can be applied. Specific examples thereof can include a melt polymerization method or a solution polymerization method such as a transesterification method or a direct esterification method.

In production of the polyester resin of the present embodiment, a transesterification catalyst, an esterification catalyst, a polycondensation catalyst or the like for use in production of a usual polyester resin can be used. Such a catalyst is not particularly limited, and examples thereof include compounds (for example, fatty acid salts, carbonates, phosphates, hydroxides, chlorides, oxides and alkoxides) of metals such as zinc, lead, cerium, cadmium, manganese, cobalt, lithium, sodium, potassium, calcium, nickel, magnesium, vanadium, aluminum, titanium, antimony, germanium and tin, and metal magnesium. These may be used singly or in combinations of two or more.

Among the above catalysts, a compound of manganese, cobalt, zinc, titanium, calcium, antimony or germanium is preferable, a compound of manganese, antimony or germanium is more preferable, and manganese(II)acetate tetrahydrate (manganese diacetate tetrahydrate), antimony(III)oxide (antimony trioxide) or germanium(IV)oxide (germanium dioxide) is further preferable.

The amount of the catalyst to be used is not particularly limited, and the amount of a metal component relative to raw materials of the polyester resin is preferably 1 to 1000 ppm, more preferably 5 to 500 ppm, further preferably 10 to 250 ppm.

In production of the polyester resin of the present embodiment, a phosphorus compound can be used as an additive. The phosphorus compound is not particularly limited, and examples thereof can include phosphoric acid, phosphorous acid, phosphate and phosphite.

Examples of the phosphate include, but not limited to the following, methyl phosphate, ethyl phosphate, butyl phosphate, phenyl phosphate, dimethyl phosphate, diethyl phosphate, dibutyl phosphate, diphenyl phosphate, trimethyl phosphate, triethyl phosphate, tributyl phosphate and triphenyl phosphate. Examples of the phosphite include methyl phosphite, ethyl phosphite, butyl phosphite, phenyl phosphite, dimethyl phosphite, diethyl phosphite, dibutyl phosphite, diphenyl phosphite, trimethyl phosphite, triethyl phosphite, tributyl phosphite and triphenyl phosphite. These may be used singly or in combinations of two or more.

Phosphoric acid is particularly preferable from the viewpoint that the phosphorus compound can be quantitatively contained in the polyester resin.

The amount of the phosphorus compound to be used is not particularly limited, and the concentration of a phosphorus atom in the polyester resin is preferably 10 to 300 ppm, more preferably 20 to 200 ppm, further preferably 30 to 100 ppm. The phosphorus compound is preferably contained in the above range because the polyester resin of the present embodiment tends to be inhibited from being colored in molding or being colored in use under a high temperature environment, and the problems of remarkably reducing the rate of polymerization and not sufficiently increasing the degree of polymerization can be prevented from being caused.

The phosphorus compound may be added at any timing in production of the polyester resin. The phosphorus compound can be added, but not particularly limited, in loading of raw materials, at the start of, during or at the completion of a transesterification or esterification reaction, or at the start of, during or at the completion of a polycondensation reaction.

In production of the polyester resin of the present embodiment, various stabilizers such as a heat stabilizer, a light stabilizer, an etherification inhibitor and an antioxidant, and various additives such as a colorant, a release agent and a polymerization modifier can be added as long as the object of the present embodiment is not impaired. These are appropriately selected depending on, for example, the reaction rate, the color tone, safety, heat stability and weather resistance of the polyester resin, and the eluting property of the polyester resin.

To the polyester resin of the present embodiment, various stabilizers such as a heat stabilizer, a light stabilizer, an etherification inhibitor and an antioxidant, and various additives such as a colorant, a release agent, a plasticizer, an ultraviolet absorber, an extender, a delusterant, a drying regulator, an antistatic agent, an anti-settling agent, a surfactant, a flow improver, a drying oil, waxes, a filler, a reinforcing material, a surface smoother, a leveling agent, a curing reaction promoter, a thickening material and a molding aid can be added as long as the object of the present embodiment is not impaired. Other resin may also be blended.

In the polyester resin of the present embodiment, the measurement value of the glass transition temperature measured by a differential scanning calorimeter is 131° C. or higher, and the amount of heat of a crystallization exothermic peak in temperature drop is 5 J/g or less. The glass transition temperature is measured at a rate of temperature rise of 20° C./min, and the amount of heat of a crystallization exothermic peak in temperature drop is measured at a rate of temperature drop of 5° C./min. When the glass transition temperature is 131° C. or higher, the polyester resin of the present embodiment can be remarkably enhanced in heat resistance as compared with PET, and can withstand a heat treatment at 100° C. or higher and use under a high temperature environment. That is, when the polyester resin is formed into an injection-molded article, such an injection-molded article can be prevented from being remarkably deformed and exhibit good dimensional stability even after boiling disinfection is performed for a long time. In addition, when the glass transition temperature is 140° C. or higher, for example, the injection-molded article is not remarkably deformed and tends to achieve still better dimensional stability even if being subjected to pressure heating (retort) sterilization at 121° C. Furthermore, when the glass transition temperature is 150° C. or higher, the dimensional stability of the injection-molded article against pressure heating sterilization tends to be still further enhanced. From the above viewpoints, the glass transition temperature is preferably 140° C. or higher, more preferably 150° C. or higher.

In addition, when the amount of heat of a crystallization exothermic peak in temperature drop is 5 J/g or less, the polyester resin of the present embodiment is sufficiently reduced in crystallinity and inhibited from whitening due to progress of crystallization, and is not impaired in transparency even in production of a thick molded article. From the above viewpoint, the amount of heat of a crystallization exothermic peak in temperature drop is preferably 3 J/g or less, more preferably 1 J/g or less, further preferably 0.1 J/g or less.

In the polyester resin of the present embodiment, the measurement value of the intrinsic viscosity (IV) at 25° C. using a mixed solvent of phenol and 1,1,2,2-tetrachloroethane in a mass ratio of 6:4 is 0.2 to 1.2 dl/g. When the intrinsic viscosity is in the above range, the polyester resin of the present embodiment exhibits sufficient mechanical properties, and the melt viscosity of the polyester resin in molding is suitable to thereby result in good moldability. That is, the intrinsic viscosity is 0.2 dl/g or more, preferably 0.3 dl/g or more, more preferably 0.4 dl/g or more, further preferably 0.43 dl/g or more, still further preferably 0.46 dl/g or more. When the intrinsic viscosity is 0.2 dl/g or more, a resin that is excellent in impact resistance and that has sufficient mechanical properties is achieved. The intrinsic viscosity is 1.2 dl/g or less, preferably 1.0 dl/g or less, more preferably 0.8 dl/g or less. When the intrinsic viscosity is 1.2 dl/g or less, not only the melt viscosity of the polyester resin can be avoided from being remarkably high and the problem about moldability, for example, the problem of hardly performing sufficient transfer to a mold in injection molding can be prevented from being caused, but also molding can be performed at a proper preheating temperature of the resin in molding, and coloration of a molded article and a reduction in mechanical properties due to heat deterioration of the resin can be prevented. From the above viewpoints, the intrinsic viscosity is preferably in the range from 0.3 to 1.0 dl/g, more preferably in the range from 0.4 to 0.8 dl/g.

The polyester resin of the present embodiment can be used for an injection-molded article, an extruded molded article such as a sheet and a film, a bottle, a foam, a pressure-sensitive adhesive, an adhesive, a paint, and the like.

The sheet and the film may be a monolayer or a multilayer, may be unstretched or stretched in a unidirection or bidirection, or may be stacked on a steel plate or the like.

The bottle may be a monolayer or a multilayer, may be a direct blow bottle or an injection blow bottle, or may be injection-molded. The foam may be a bead foam or an extruded foam.

The polyester resin of the present embodiment can be suitably utilized in an application where high heat resistance is required. Specific application examples include, but not limited to the following, a transparent container that can be applied to storage of a high-temperature product, heating for sterilization and cooking, packing of contents at high temperatures, and the like, a medical instrument and a baby product where high-temperature sterilization is required, a packaging material for products to be exported beyond the equator, an electronic material and an automobile component to be exposed to a severe temperature, and various industrial covers.

<Second Embodiment>

Hereinafter, a second embodiment of the present invention is described. Herein, overlapped description of the same content as in the first embodiment is omitted.

[Injection-molded Article]

An injection-molded article of the present embodiment is an injection-molded article obtained from the polyester resin comprising the diol unit and the dicarboxylic acid unit. Furthermore, in the injection-molded article of the present embodiment, 50 to 95% by mol of the diol unit of the polyester resin is the unit derived from the pentacyclopentadecane dimethanol represented by the formula (I) and/or the pentacyclopentadecane dimethanol represented by the formula (II), 50 to 100% by mol of the dicarboxylic acid unit of the polyester resin is the unit derived from an aromatic dicarboxylic acid, and the polyester resin satisfies the following conditions (1) and (2):

(1) the measurement value of the glass transition temperature measured by a differential scanning calorimeter is 131° C. or higher, and the amount of heat of a crystallization exothermic peak in temperature drop is 5 J/g or less; and (2) the measurement value of the intrinsic viscosity (IV) at 25° C. using a mixed solvent of phenol and 1,1,2,2-tetrachloroethane in amass ratio of 6:4 is 0.2 to 1.2 dl/g.

The injection-molded article of the present embodiment is constituted as described above, therefore is excellent in transparency and heat resistance, and has dimensional stability so that neither poor appearance nor a large dimensional change is caused after boiling disinfection. That is, the injection-molded article of the present embodiment has more excellent heat resistance than that of an injection-molded article obtained by using a conventionally known heat resistant transparent polyester resin or a general-purpose transparent resin such as polystyrene and an acrylonitrile-styrene copolymer, to cause neither poor appearance nor a large dimensional change even after boiling disinfection. Therefore, the injection-molded article can be suitably utilized in applications where a high-temperature sterilization treatment is required, such as food/beverage containers, a cosmetic container, a medical instrument, and baby products such as a baby bottle and a pacifier. In addition, the injection-molded article is large in the degree of freedom of the shape of the molded article and also high in productivity, and therefore is extremely useful in terms of properties of injection molding.

As described above, the polyester resin for use in the second embodiment of the present invention is the same as that described in the first embodiment.

A combination of the diol unit and the dicarboxylic acid unit of the polyester resin for use in the injection-molded article of the present embodiment is preferably a resin containing the unit derived from the pentacyclopentadecane dimethanol and the unit derived from ethylene glycol as the diol unit, and the unit derived from terephthalic acid and/or the unit derived from 2,6-naphthalenedicarboxylic acid as the dicarboxylic acid unit.

When the unit derived from terephthalic acid is mainly contained as the dicarboxylic acid unit, the proportion of the unit derived from the pentacyclopentadecane dimethanol in the diol unit is preferably 50 to 90% by mol of the entire diol unit, more preferably 51 to 85% by mol, further preferably 51 to 80% by mol, still further preferably 55 to 80% by mol, from the viewpoint of further enhancing heat resistance and mechanical properties of the polyester resin. The proportion of the unit derived from ethylene glycol in the diol unit is preferably 10 to 50% by mol of the entire diol unit, more preferably 15 to 49% by mol, further preferably 20 to 49% by mol, still further preferably 20 to 45% by mol. Furthermore, the proportion of the unit derived from terephthalic acid in the dicarboxylic acid unit is preferably 70 to 100% by mol, more preferably 80 to 100% by mol, further preferably 90 to 100% by mol.

When the unit derived from 2,6-naphthalenedicarboxylic acid is mainly contained as the dicarboxylic acid unit, higher heat resistance tends to be achieved.

When the unit derived from 2,6-naphthalenedicarboxylic acid is contained as the dicarboxylic acid unit, the proportion of the unit derived from the pentacyclopentadecane dimethanol in the diol unit is preferably 50 to 90% by mol of the entire diol unit, more preferably 51 to 90% by mol, further preferably to 80% by mol, still further preferably 55 to 80% by mol, in terms of heat resistance and transparency. The proportion of the unit derived from ethylene glycol in the diol unit is preferably 5 to 50% by mol of the entire diol unit, more preferably 10 to 50% by mol, further preferably 15 to 49% by mol, still further preferably 20 to 49% by mol, furthermore preferably 20 to 45% by mol, in terms of heat resistance and mechanical properties. Furthermore, the proportion of the unit derived from 2,6-naphthalenedicarboxylic acid in the dicarboxylic acid unit is preferably 70 to 100% by mol, more preferably 80 to 100% by mol, further preferably 90 to 100% by mol, in terms of heat resistance.

The polyester resin for use in the injection-molded article of the present embodiment preferably satisfies the following condition (3):

(3) in a test where a 1A type multi-purpose test piece (test piece having a shape illustrated in FIG. 3) produced by injection molding with the following molding method and described in the tensile property testing method according to JIS K7162 is immersed in boiling water at 100° C. for 30 minutes, the rate of dimensional change after immersion in boiling water, calculated from the following formula (1), is 0.50% or less in each of the thickness direction and the width direction, and 0.60% or less in the entire length direction. Herein, the injection molding is performed as follows: the polyester resin of the present embodiment is subjected to injection molding using an injection molding machine (manufactured by Sumitomo Heavy Industries, Ltd., Model: SE130DU-HP) under temperature conditions of a cylinder temperature of 230 to 260° C. and a mold temperature of 60° C.

$$\Delta M = |M - M_0|/M_0 \times 100 \quad \text{Formula (1)}$$

wherein $\Delta M$ represents the rate of dimensional change [%], $M_0$ represents the dimension before immersion in boiling water [mm], and M represents the dimension after immersion in boiling water [mm].

With respect to the rate of dimensional change after immersion in boiling water, the rate of dimensional change in the thickness direction is determined as follows: the dimensions in the thickness direction before and after immersion in boiling water are measured at nine points of 10 mm, 30 mm, 50 mm, 70 mm, 85 mm, 100 mm, 120 mm, 140 mm and 160 mm from the test piece end on the center axis illustrated by a dotted line in FIG. 3, the respective rates of dimensional change are calculated from the resulting measurement values and the formula (1), and the arithmetic average thereof is defined as the rate of dimensional change in the thickness direction.

The rate of dimensional change in the width direction is determined as follows: the dimensions in the width direction before and after immersion in boiling water are measured at nine points of 10 mm, 30 mm, 50 mm, 70 mm, 85 mm, 100 mm, 120 mm, 140 mm and 160 mm from the test piece end in FIG. 3, the respective rates of dimensional change are calculated from the resulting measurement values and the formula (1), and the arithmetic average thereof is defined as the rate of dimensional change in the width direction.

The rate of dimensional change in the entire length direction is determined as follows: the dimensions in the entire length direction before and after immersion in boiling water are measured on the center axis illustrated by a dotted line in FIG. 3, and the rate of dimensional change in the entire length direction is calculated from the resulting measurement values and the formula (1).

A case where the rate of dimensional change after immersion in boiling water in the above test is 0.50% or less in the thickness direction or the width direction, or is 0.60% or less in the entire length direction is preferable because remarkable deformation tends to be able to be prevented in boiling disinfection for a long time, in particular, even if the shape of the injection-molded article is complicated. From the above viewpoint, the rate of dimensional change after immersion in boiling water in the above test is more preferably 0.40% or less, further preferably 0.30% or less, in each of the thickness direction and the width direction. The rate of dimensional change in the entire length direction is more preferably 0.50% or less, further preferably 0.40% or less.

The injection-molded article of the present embodiment can be produced by a conventionally known injection molding method. Examples thereof include a method including supplying the polyester resin to an injection molding machine having an injection unit and a clamping unit, heating and melting the resin at the melting temperature, injecting the resin to a mold having a predetermined shape, and cooling and solidifying the resin in the mold to provide a molded article.

The injection-molded article of the present embodiment can also be formed into a multi-layered article by co-injection molding with other resin.

In molding of the injection-molded article of the present embodiment, various stabilizers such as a heat stabilizer, alight stabilizer, an etherification inhibitor and an antioxidant, and various additives such as a colorant, a release agent, a plasticizer, an ultraviolet absorber, an extender, a delusterant, a drying regulator, an antistatic agent, an anti-settling agent, a surfactant, a flow improver, a drying oil, waxes, a filler, a reinforcing material, a surface smoother, a leveling agent, a curing reaction promoter, a thickening material and a molding aid can be added as long as the object of the present embodiment is not impaired. Other resin may also be blended.

The injection-molded article of the present embodiment is transparent and has heat resistance so that it can withstand boiling disinfection, and therefore can be suitably utilized in applications where a high-temperature sterilization treatment is required, such as food/beverage containers, a cosmetic container, a medical instrument, and baby products such as a baby bottle and a pacifier. Furthermore, the injection-molded article can also be utilized in applications where it is used under a severe temperature condition, such as an electronic material and an automobile component.

<Third Embodiment>

Hereinafter, a third embodiment of the present invention is described. Herein, overlapped description of the same contents as those in the first embodiment to the second embodiment is omitted.

[Polyester Sheet]

A polyester sheet of the present embodiment is obtained by subjecting the polyester resin comprising the diol unit and the dicarboxylic acid unit to molding. Furthermore, in the polyester sheet of the present embodiment, 50 to 95% by mol of the diol unit of the polyester resin is the unit derived from the pentacyclopentadecane dimethanol represented by the formula (I) and/or the pentacyclopentadecane dimethanol represented by the formula (II), 50 to 100% by mol of the dicarboxylic acid unit of the polyester resin is the unit derived from an aromatic dicarboxylic acid, and the polyester resin satisfies the following conditions (1) and (2):

(1) the measurement value of the glass transition temperature of the polyester resin, measured by a differential scanning calorimeter, is 131° C. or higher, and the amount of heat of a crystallization exothermic peak in temperature drop is 5 J/g or less; and (2) the measurement value of the intrinsic viscosity (IV) at 25° C. of the polyester resin, using a mixed solvent of phenol and 1,1,2,2-tetrachloroethane in a mass ratio of 6:4, is 0.2 to 1.2 dl/g.

The polyester sheet of the present embodiment is constituted as described above, and therefore is excellent in transparency and heat resistance. That is, the polyester sheet of the present embodiment has more excellent heat resistance than that of a sheet obtained by using a conventionally known heat resistant transparent polyester resin or a general-purpose transparent resin such as polystyrene and an acrylonitrile-styrene copolymer. Therefore, the polyester sheet of the present embodiment, and a molded article obtained by subjecting the sheet to molding can also be applied in operations such as high-temperature sterilization and packing of contents at high temperatures, and can be suitably utilized for a container, a packaging material, and the like in the food field, the cosmetic field, and the medical field. In addition, the sheet can also be utilized for industrial materials such as a building material, an optical material and an automobile component. Accordingly, the sheet has extremely high industrial applicability, As described above, the polyester resin for use in the third embodiment of the present invention is the same as that described in the first embodiment.

In addition, a preferable combination of the diol unit and the dicarboxylic acid unit of the polyester resin for use in the third embodiment of the present invention is the same as that described in the second embodiment.

The polyester sheet of the present embodiment can be produced by, but not limited to the following, a conventionally known method such as extrusion molding or calendar molding. The polyester sheet can also be formed into a multi-layer sheet by use of a conventionally known stacking technique such as a co-extrusion method, an extrusion laminating method, a co-extrusion laminating method or a dry laminating method. An adhesive or an adhesion resin can also be used between the resins for the purpose of such stacking.

In production of the polyester sheet of the present embodiment, various stabilizers such as a heat stabilizer, a light stabilizer, an etherification inhibitor and an antioxidant, and various additives such as a colorant, a release agent, a plasticizer, an ultraviolet absorber, an extender, a delusterant, a drying regulator, an antistatic agent, an anti-settling agent, a surfactant, a flow improver, a drying oil, waxes, a filler, a reinforcing material, a surface smoother, a leveling agent, a curing reaction promoter, a thickening agent and a molding aid can be added as long as the object of the present embodiment is not impaired. Other resin may also be blended.

In the present embodiment, the polyester resin for use in the polyester sheet preferably satisfies the following conditions (4) and (5):

(4) the measurement value of the total light transmittance of each of a sheet having a thickness of 0.20 mm and a sheet having a thickness of 0.35 mm is 86% or more; and (5) when a square test piece of a size of 120 mm in longitudinal length×120 mm in lateral width, where the extrusion direction is defined as the longitudinal direction and the width direction is defined as the lateral direction, is cut out from the sheet having a thickness of 0.20 mm and a marked line having a length of 100 mm is signed on the center line in each of the longitudinal direction and the lateral direction of the test piece, and the test piece is heated in a dryer for 30 minutes, the maximum temperature (heat resistance temperature), at which the rate of change in the marked line length after heating, calculated from the following formula (2), is not more than 0.5% in each of the longitudinal length and the lateral width, is 110° C. or higher:

$$\Delta L = |L - L_0|/L_0 \times 100 \quad \text{Formula (2)}$$

wherein $\Delta L$ represents the rate of change in the marked line length [%], $L_0$ represents the marked line length before heating [mm], and L represents the marked line length after heating [mm].

As described above, the polyester sheet of the present embodiment is preferably obtained using a polyester resin in which, when a sheet having a thickness of 0.20 to 0.35 mm is molded, the total light transmittance value measured based on JIS K7105 is 86% or more. When the total light transmittance is 86% or more, visibility tends to be sufficient to result in an enhancement in practical value as a transparent material. From the above viewpoint, the total light transmittance is more preferably 88% or more, further preferably 90% or more.

The polyester sheet of the present embodiment is preferably obtained using a polyester resin in which, when a square test piece of a size of 120 mm in longitudinal length×120 mm in lateral width, where the extrusion direction is defined as the longitudinal direction and the width direction is defined as the lateral direction, is cut out from a molded sheet having a thickness of 0.20 mm and a marked line having a length of 100 mm is signed on the center line in each of the longitudinal direction and the lateral direction of the test piece as illustrated in FIG. 4, and the test piece is heated in a dryer for 30 minutes, the maximum temperature (hereinafter, sometimes abbreviated as "heat resistance temperature A".), at which the rate of change in the marked line length after heating, calculated from the formula (2), is not more than in each of the longitudinal length and the lateral width, is 110° C. or higher. When the heat resistance temperature A is 110° C. or higher, there is a tendency to impart heat resistance so that the polyester sheet sufficiently withstands a heat treatment at 100° C. or higher and use under a high temperature environment. From the above viewpoint, the heat resistance temperature A is more preferably 115° C. or higher, further preferably 120° C. or higher.

The thickness of the polyester sheet of the present embodiment can be appropriately set depending on the application, and is usually 0.05 mm to 10 mm. Specific examples thereof include, but not limited to the following, a thickness of 0.10 mm to 3 mm in a sheet for foods, and a thickness of 1 mm or more in a thick sheet for a building material application, an electronic material application, a commercial product display application, and the like.

The polyester sheet of the present embodiment can be subjected to, for example, but not limited to the following, secondary molding by a conventionally known method such as vacuum molding, compressed air molding or vacuum compressed air molding (compressed air vacuum molding) and thus used for molded articles of various shapes. The molding system of thermal molding described above is not particularly limited, and any system such as a straight method, a drape method or a plug-assist method may be used. If a conventionally known sheet of PET, PEN or the like is produced by the above method, the resulting molded article therefrom may be whitened. On the other hand, the polyester sheet of the present embodiment can be suppressed in crystallinity and thus cause no whitening, to provide a molded article excellent in transparency.

When the molded article (having a container shape) obtained by subjecting the polyester sheet of the present embodiment to molding is heated in a dryer for 30 minutes, the maximum temperature (hereinafter, sometimes abbreviated as "heat resistance temperature B".), at which the height retention rate of the container after heating, calculated from the following formula (3), is 98% or more, is preferably 100° C. or higher. When the heat resistance temperature B is 100° C. or higher, there is a tendency to impart heat resistance so that the molded article sufficiently withstands packing of contents at high temperatures and use under a high temperature environment. From the above viewpoint, the heat resistance temperature B is more preferably 105° C. or higher, further preferably 110° C. or higher.

$$\Delta H = H/H_0 \times 100 \quad \text{Formula (3)}$$

wherein $\Delta H$ represents the height retention rate of the container [%], $H_0$ represents the height of the container before heating [mm], and H represents the height of the container after heating [mm].

<Fourth Embodiment>

Hereinafter, a fourth embodiment of the present invention is described. Herein, overlapped description of the same contents as those in the first embodiment to the third embodiment is omitted.

[Polyester Container]

A polyester container of the present embodiment is obtained by subjecting the polyester resin comprising the diol unit and the dicarboxylic acid unit to molding. Furthermore, in the polyester container of the present embodiment, 50 to 95% by mol of the diol unit of the polyester resin is the unit derived from the pentacyclopentadecane dimethanol represented by the formula (I) and/or the pentacyclopentadecane dimethanol represented by the formula (II), 50 to 100% by mol of the dicarboxylic acid unit of the polyester resin is the unit derived from an aromatic dicarboxylic acid, and the polyester resin satisfies the following conditions (1) and (2):

(1) the measurement value of the glass transition temperature of the polyester resin, measured by a differential scanning calorimeter, is 131° C. or higher, and the amount of heat of a crystallization exothermic peak in temperature drop is 5 J/g or less; and (2) the measurement value of the intrinsic viscosity (IV) at 25° C. of the polyester resin, using a mixed solvent of phenol and 1,1,2,2-tetrachloroethane in a mass ratio of 6:4, is 0.2 to 1.2 dl/g.

The polyester container of the present embodiment is constituted as described above, and therefore is excellent in transparency and heat resistance. That is, the polyester container of the present embodiment has more excellent heat resistance than that of a container obtained by subjecting a conventionally known heat resistant transparent polyester resin or a general-purpose transparent resin such as polystyrene and an acrylonitrile-styrene copolymer to molding. Therefore, the container can be applied in storage of a high-temperature product, heating for sterilization and cooking, packing of contents at high temperatures, transport under a high temperature environment, and the like, can be suitably utilized for a container for foods/beverages, a container for toiletry products, a container for drugs and medicines, and the like, and has extremely high industrial applicability.

As described above, the polyester resin for use in the fourth embodiment of the present invention is the same as that described in the first embodiment.

In addition, a preferable combination of the diol unit and the dicarboxylic acid unit of the polyester resin for use in the fourth embodiment of the present invention is the same as that described in the second embodiment.

The polyester container of the present embodiment can be produced by a conventionally known method. The product method is not particularly limited, and examples thereof include hollow molding (blow molding) of the polyester resin for use in the present embodiment, and thermal molding of a sheet containing the polyester resin. If a conventionally known sheet of PET, PEN or the like is produced by the above method, the resulting container therefrom may be whitened. On the other hand, the polyester resin for use in the present embodiment can be suppressed in crystallinity and thus cause no whitening, to provide a container excellent in transparency.

In the present embodiment, the polyester resin for use in the polyester container preferably satisfies the following condition (6):

(6) when a polyester container having the following shape is heated in a dryer for 30 minutes, the maximum temperature (heat resistance temperature), at which the height retention rate of the container after heating, calculated from the following formula (3), is 98% or more, is 100° C. or higher.

<Shape of Container>

The container is a container having an opening of 70 mm×70 mm, a height of 25 mm and a volume of about 100 mL, obtained by subjecting a polyester sheet having a thickness of 0.35 mm to thermal molding at a drawing ratio of 0.36 by use of a compressed air vacuum molding machine.

$$\Delta H = H/H_0 \times 100 \quad \text{<Formula (3)>}$$

wherein ΔH represents the height retention rate of the container [%], $H_0$ represents the height of the container before heating [mm], and H represents the height of the container after heating [mm].

Herein, the polyester sheet having a thickness of 0.35 mm is obtained as follows.

The polyester resin in the present embodiment is loaded to a sheet production apparatus including an extruder (manufactured by PULAENG CO., LTD., trade name: PSV-30 (bore diameter: 30 mm, L/D=36)), a T die, a cooling roll and a winding machine, to produce a sheet having a thickness of about 0.35 mm by a T die method.

Molding is performed under conditions of a cylinder temperature of 240° C., a die temperature of 250° C., a screw rotation speed of 35 to 36 rpm, roll speeds (main roll speed, pinch roll speed) of 0.6 to 0.8 m/min and a roll temperature of 145° C.

The polyester container of the present embodiment is preferably obtained using a polyester resin in which, when the container having the above shape is molded and then heated in a dryer for 30 minutes, the maximum temperature (hereinafter, sometimes abbreviated as "heat resistance temperature C".), at which the height retention rate (the average of the height retention rates measured at four corners of the container) of the container after heating, calculated from the formula (3), is 98% or more, is 100° C. or higher. When the heat resistance temperature C is 100° C. or higher, the container can withstand, for example, packing of contents at high temperatures and use under a high temperature environment. From the above viewpoint, the heat resistance temperature C is more preferably 105° C. or higher, further preferably 110° C. or higher.

Examples of the hollow molding include, but not limited to the following, injection blow molding and direct blow molding. The molding system of the hollow molding is not particularly limited, and may be a 1-stage system (hot parison method) or a 2-stage system (cold parison method). The polyester resin can also be co-injected or co-extruded with other resin to thereby allow the container to be multi-layered.

In production of the polyester container of the present embodiment by the hollow molding, various stabilizers such as a heat stabilizer, a light stabilizer, an etherification inhibitor and an antioxidant, and various additives such as a colorant, a release agent, a plasticizer, an ultraviolet absorber, an extender, a delusterant, a drying regulator, an antistatic agent, an anti-settling agent, a surfactant, a flow improver, a drying oil, waxes, a filler, a reinforcing material, a surface smoother, a leveling agent, a curing reaction promoter, a thickening agent and a molding aid can be added as long as the object of the present embodiment is not impaired. Other resin may also be blended.

Examples of the thermal molding include, but not limited to the following, vacuum molding, compressed air molding and vacuum compressed air molding (compressed air vacuum molding). The forming system of the thermal molding is not particularly limited, and any system such as a straight method, a drape method or a plug-assist method may be used. The container can also be multi-layered by using a polyester sheet multi-layered with other resin by a method described later, as a raw sheet.

The polyester sheet for use in the thermal molding can be produced by a conventionally known method such as extrusion molding or calendar molding. Furthermore, the polyester sheet can also be formed into a multi-layer sheet by use of a conventionally known stacking technique such as a co-extrusion method, an extrusion laminating method, a co-extrusion laminating method or a dry laminating method. A suitable adhesive or adhesion resin can also be used between the resins for the purpose of such stacking.

In production of the polyester sheet for use in the thermal molding, various stabilizers such as a heat stabilizer, a light stabilizer, an etherification inhibitor and an antioxidant, and various additives such as a colorant, a release agent, a plasticizer, an ultraviolet absorber, an extender, a delusterant, a drying regulator, an antistatic agent, an anti-settling agent, a surfactant, a flow improver, a drying oil, waxes, a filler, a reinforcing material, a surface smoother, a leveling agent, a curing reaction promoter, a thickening agent and a molding aid can be added as long as the object of the present embodiment is not impaired. Other resin may also be blended.

The thickness of the polyester sheet for use in the thermal molding is not particularly limited, and is usually about 0.10 mm to 3 mm.

EXAMPLES

Hereinafter, the present embodiment is described with reference to Examples in more detail, but the scope of the present embodiment is not limited to such Examples.

[Evaluation Methods of Polyester Resin]

(1) Copolymerization Composition

The proportions of the diol unit and the dicarboxylic acid unit in the polyester resin were calculated from the ratio of the peak areas of the respective constituent units by $^1$H-NMR measurement. A nuclear magnetic resonance apparatus (manufactured by Bruker Biospin, trade name: AVANCE III 500/Ascend 500) was used as the measurement apparatus, and the measurement was made at 500 MHz. Deuterochloroform was used as the solvent. When the solubility of the polyester resin was not sufficient, deuterotrifluoroacetic acid was added in a proper amount to ensure sufficient solubility.

(2) Glass Transition Temperature (Tg)

The glass transition temperature of the polyester resin was measured using a differential scanning calorimeter (manufactured by Shimadzu Corporation, trade name: DSC-60/TA-60WS). The polyester resin (5 to 10 mg) was loaded to an aluminum non-hermetic container, and heated to 280° C. at a rate of temperature rise of 20° C./min and then rapidly cooled in a nitrogen gas (50 mL/min) stream, to provide a measurement sample. The sample was heated again under the same condition, and the temperature (intermediate glass transition temperature) at which the change of the DSC curve reached ½ of the difference in base line before and after transition was defined as the glass transition temperature.

(3) Amount of Crystallization Heat Generated in Temperature Drop (ΔHc)

The amount of crystallization heat generated in temperature drop of the polyester resin was calculated from the area of the exothermic peak that appeared in temperature drop at a rate of 5° C./min after measurement of the Tg and then maintaining of the temperature at 280° C. for 1 minute.

(4) Intrinsic Viscosity (IV)

The polyester resin was dissolved in a mixed solvent of phenol/1,1,2,2-tetrachloroethane=6/4 (mass ratio) to prepare measurement solutions of three concentrations (0.2 g/dl, 0.4 g/dl and 0.6 g/dl). The specific viscosities in the respective concentrations were measured using a relative viscometer (manufactured by Viscotek, Model: Y501) at a constant temperature of 25° C. The resulting specific viscosities were divided by the respective concentrations of the measurement solutions to calculate the reduced viscosities in the respective concentrations. The respective reduced viscosities were plotted on the vertical axis and the respective solution concentrations were plotted on the horizontal axis to draw an approximate straight line, the resulting straight line was extrapolated to infinite dilution to provide an intercept, and the intercept was defined as the intrinsic viscosity of the polyester resin.

[Evaluation Methods of Injection-molded Article]

(1) Deflection Temperature Under Load

The deflection temperature under load of the molded article was measured according to JIS K7191 with, as a sample, a reed-shaped injection-molded article having a shape and a dimension illustrated in FIG. 1. Such measurement was performed at a rate of temperature rise of a heating medium of 120° C./h and at a bending stress applied to the sample of 0.45 MPa or 1.80 MPa by use of an edgewise test system, and the temperature at which the magnitude of deflection of the sample reached 0.26 mm was defined as the deflection temperature under load. The measurement was performed using an automatic HDT testing apparatus (manufactured by Toyo Seiki Seisaku-Sho, Ltd., Model: 3A-2).

(2) Transparency

The transparency of the molded article was evaluated by measuring the total light transmittance and the haze by a transmission method according to JIS K7105 with, as a sample, a disc-shaped injection-molded article having a shape and a dimension illustrated in FIG. 2. Such measurement was performed using a color-difference/turbidity measuring instrument (manufactured by Nippon Denshoku Industries Co., Ltd., Model: COH-400).

(3) Boiling Resistance

The boiling resistance of the injection-molded article was evaluated using a test piece (1A type multi-purpose test piece) having a shape illustrated in FIG. 3, described in the tensile property testing method according to JIS K7162. The injection-molded article was immersed in boiling water at 100° C. for 30 minutes, the dimension thereof was measured before and after the immersion, and the rate of dimensional change after immersion in boiling water in each of the thickness direction, the width direction and the entire length direction was calculated from the following formula (1) to evaluate the boiling resistance.

$$\Delta M = |M - M_0|/M_0 \times 100 \quad \text{Formula (1)}$$

wherein $\Delta M$ represents the rate of dimensional change [%], $M_0$ represents the dimension before immersion in boiling water [mm], and M represents the dimension after immersion in boiling water [mm].

Herein, the dimension in each of the thickness direction and the width direction was measured using a micrometer (manufactured by Mitutoyo Corporation, Code number: 293-661-10), and the dimension in the entire length direction was measured using a stainless ruler with a scale in increments of 1 mm (manufactured by Shinwa Rules Co., Ltd.).

When the changes in appearances such as warpage, cracking and whitening were visually observed, these were described as the test results.

[Evaluation Methods of Sheet]

(1) Transparency

The transparency of the sheet was evaluated by measuring the total light transmittance and the haze by a transmission method according to JIS K7105 with, as a sample, a square test piece cut out to a size of 50 mm in longitudinal length×50 mm in lateral width, where the extrusion direction was defined as the longitudinal direction and the width direction was defined as the lateral direction, from each of a sheet having a thickness of 0.20 mm and a sheet having a thickness of 0.35 mm. Such measurement was performed using a color-difference/turbidity measuring instrument (manufactured by Nippon Denshoku Industries Co., Ltd., Model: COH-400).

(2) Heat Resistance

The heat resistance of the sheet was evaluated with the heat resistance temperature being defined by the following testing method with reference to JIS K7133. A square test piece of a size of 120 mm in longitudinal length×120 mm in lateral width, where the extrusion direction was defined as the longitudinal direction and the width direction was defined as the lateral direction, was cut out from a sheet having a thickness of 0.20 mm, and a marked line having a length of 100 mm was signed on the center line in each of the longitudinal direction and the lateral direction of the test piece, as illustrated in FIG. 4. The test piece was left to still stand on a metallic tray paved with talc, and heated in a dryer (manufactured by Yamato Scientific Co., Ltd., Model: DN63) set at the testing temperature (constant temperature) for 30 minutes, and the rate of change in the marked line distance after heating was calculated from the marked line distances (marked line lengths) measured before and after heating, as well as the following formula (2).

The maximum temperature at which the rate of change in the marked line length after heating was not more than 0.5% in each of the longitudinal and lateral directions was defined as the heat resistance temperature of the sheet. Herein, the test was performed at a temperature in increments of 5° C. The marked line length was measured using a stainless ruler with a scale in increments of 0.5 mm (manufactured by Shinwa Rules Co., Ltd.).

$$\Delta L = |L - L_0|/L_0 \times 100 \quad \text{Formula (2)}$$

wherein $\Delta L$ represents the rate of change in the marked line length [%], $L_0$ represents the marked line length before heating [mm], and L represents the marked line length after heating [mm].

[Evaluation Methods of Sheet Molded Article and Container]

(1) Transparency

The appearance of the molded article was visually evaluated. Symbols in Table are as follows.

○: Sufficient transparency could be observed.

X: Transparency was impaired due to whitening and the like.

(2) Heat Resistance

The heat resistance of the molded article (container produced by a method described later) was evaluated with the heat resistance temperature being defined by the following testing method. The container was left to still stand in a dryer (manufactured by Yamato Scientific Co., Ltd., Model: DN63) set at the testing temperature (constant temperature), and heated for 30 minutes, and the height retention rate of the container after heating was calculated from the heights of the container measured before and after heating, as well as the following formula (3).

The maximum temperature at which the height retention rate of the container after heating was 98% or more was defined as the heat resistance temperature of the container. Herein, the test was performed at a temperature in increments of 5° C. The height of the container was measured using a height gauge (manufactured by Mitutoyo Corporation, Code number: 192-653), and defined as the average of the values measured at four points (four corners of the container).

$$\Delta H = H/H_0 \times 100 \quad \text{Formula (3)}$$

wherein ΔH represents the height retention rate of the container [%], $H_0$ represents the height of the container before heating [mm], and H represents the height of the container after heating [mm].

[Synthesis and Evaluation of Polyester Resin]

Examples 1-1 to 1-2 and Comparative Examples 1-1 to 1-2

Raw material monomers in amounts described in Table 1 were loaded to a polyester production apparatus equipped with a partial condenser, a total condenser, a cold trap, a stirrer, a heating apparatus and a nitrogen introduction tube, and heated to 245 to 260° C. under a nitrogen pressure of 0.3 MPa to perform an esterification reaction. After the reaction conversion of the dicarboxylic acid component, calculated from the amount of water distilled out from a reactor, reached 90% or more, antimony(III) oxide and phosphoric acid were added in amounts described in Table 1, temperature rise and pressure reduction were gradually performed, and polycondensation was finally performed at 260 to 280° C. and 0.1 kPa or less. Once a proper melt viscosity was achieved, the reaction was terminated to recover a polyester resin.

The evaluation results of the polyester resin obtained are shown in Table 1.

[Production and Evaluation of Injection-molded Article]

Examples 1-1 to 1-2 and Comparative Examples 1-1 to 1-2

The polyester resin obtained was used to produce an injection-molded article by use of an injection molding machine (manufactured by Sumitomo Heavy Industries, Ltd., Model: SE130DU-HP) under temperature conditions of a cylinder temperature of 230 to 260° C. and a mold temperature of 60° C.

The evaluation results of the polyester resin obtained are shown in Table 1.

Comparative Examples 1-3 to 1-5

A polyester resin containing no diol unit having a pentacyclopentadecane backbone: Tritan (TX2001) (produced by Eastman Chemical Company) or Tritan (TX1001) (produced by Eastman Chemical Company), or an acrylonitrile-styrene copolymer: Stylac AS (T8707) (produced by Asahi Kasei Chemicals Corporation) was used to produce an injection-molded article in an injection molding machine (manufactured by Sumitomo Heavy Industries, Ltd., Model: SE130DU-HP) under temperature conditions of a cylinder temperature of 230 to 260° C. and a mold temperature of 60° C.

The evaluation results are shown in Table 2.

Comparative Example 1-6

PSJ-polystyrene (HF77) (produced by PS Japan Corporation) was used to produce an injection-molded article by use of an injection molding machine (manufactured by Sumitomo Heavy Industries, Ltd., Model: SE130DU-HP) under temperature conditions of a cylinder temperature of 210 to 230° C. and a mold temperature of 60° C.

The evaluation results are shown in Table 2.

TABLE 1

| | | Example 1-1 | Example 1-2 | Comparative Example 1-1 | Comparative Example 1-2 |
|---|---|---|---|---|---|
| Synthesis of polyester resin | | | | | |
| Amount of monomer loaded (mol) | | | | | |
| Dicarboxylic acid | PTA | 9.604 | 8.512 | 12.384 | 10.262 |
| Diol | PCPDM | 5.762 | 6.810 | 3.096 | 5.131 |
| | EG | 6.243 | 3.831 | 12.384 | 7.697 |
| Amounts of catalyst and additive loaded (×10$^{-3}$ mol) | | | | | |
| Antimony(III) oxide | | 1.441 | 1.277 | 1.858 | 1.539 |
| Phosphoric acid | | 7.011 | 6.980 | 4.953 | 4.105 |
| Evaluation results (polyester resin) | | | | | |
| Copolymerization composition (% by mol) | PTA | 100 | 100 | 100 | 100 |
| | PCPDM | 56 | 75 | 23 | 47 |
| | EG | 43 | 24 | 76 | 52 |
| | DEG | 1 | 1 | 1 | 1 |
| Glass transition temperature (Tg) (° C.) | | 140 | 155 | 104 | 130 |
| Amount of heat of a crystallization exothermic peak in temperature drop (Δ Hc) (J/g) | | 0 | 0 | 0 | 0 |
| Intrinsic viscosity (IV) (dl/g) | | 0.51 | 0.49 | 0.63 | 0.54 |
| Evaluation results (molded article) | | | | | |
| Deflection temperature under load (0.45 MPa) (° C.) | | | 141 | 92 | 114 |
| Deflection temperature under load (1.80 MPa) (° C.) | | | 124 | 78 | 100 |
| Total light transmittance (3.2 mm) (%) | | | 84 | 85 | 82 |
| Haze (3.2 mm) (%) | | | 5.7 | 5.7 | 6.6 |

Herein, abbreviations in the Table are as follows.
PTA: high-purity terephthalic acid
PCPDM: pentacyclopentadecane dimethanol
EG: ethylene glycol
DEG: diethylene glycol viscosity was achieved, the reaction was terminated to recover a polyester resin.

The composition and the evaluation results of the polyester resin obtained are shown in Table 3 and Table 4, respectively.

TABLE 2

|  | Comparative Example 1-3 | Comparative Example 1-4 | Comparative Example 1-5 | Comparative Example 1-6 |
|---|---|---|---|---|
| Product name and grade | Tritan (TX2001) | Tritan (TX1001) | Stylac AS (T8707) | PSJ-Polystyrene (HF77) |
| Evaluation results (resin) | | | | |
| Glass transition temperature (Tg) (° C.) | 120 | 112 | 108 | 98 |
| Amount of heat of a crystallization exothermic peak in temperature drop (Δ Hc) (J/g) | 0 | 0 | 0 | 0 |
| Intrinsic viscosity (IV) (dl/g) | 0.69 | 0.77 | 1.07 | 0.64 |
| Evaluation results (molded article) | | | | |
| Deflection temperature under load (0.45 MPa) (° C.) | 103 | 94 | 94 | 88 |
| Deflection temperature under load (1.80 MPa) (° C.) | 87 | 80 | 84 | 79 |
| Total light transmittance (3.2 mm) (%) | 89 | 90 | 91 | 91 |
| Haze (3.2 mm) (%) | 0.8 | 0.7 | 0.5 | 0.9 |

[Synthesis of Polyester Resin]

Production Examples 2-1 to 2-3

Raw material monomers in amounts described in Table 3 were loaded to a polyester production apparatus equipped with a partial condenser, a total condenser, a cold trap, a stirrer, a heating apparatus and a nitrogen introduction tube, and heated to 245 to 260° C. under a nitrogen pressure of 0.3 MPa to perform an esterification reaction. After the reaction conversion of the dicarboxylic acid component, calculated from the amount of water distilled out from a reactor, reached 90% or more, antimony(III)oxide and phosphoric acid were added in amounts described in Table 3, temperature rise and pressure reduction were gradually performed, and polycondensation was finally performed at 260 to 280° C. and 0.1 kPa or less. Once a proper melt viscosity was achieved, the reaction was terminated to recover a polyester resin.

The composition of the polyester resin obtained is shown in Table 3.

Production Example 2-4

Raw material monomers and manganese(II)acetate tetrahydrate in amounts described in Table 3 were loaded to a polyester production apparatus equipped with a partial condenser, a total condenser, a cold trap, a stirrer, a heating apparatus and a nitrogen introduction tube, and heated to 220 to 235° C. under a nitrogen pressure of 0.15 MPa to perform a transesterification reaction. After the reaction conversion of the dicarboxylic acid ester component, calculated from the amount of methanol distilled out from a reactor, reached 90% or more, antimony(III)oxide and phosphoric acid were added in amounts described in Table 3, temperature rise and pressure reduction were gradually performed, and polycondensation was finally performed at 260 to 280° C. and 0.1 kPa or less. Once a proper melt

[Production and Evaluation of Injection-Molded Article]

Example 2-1, Reference Examples 2-1 to 2-2 and Comparative Example 2-1

The polyester resin obtained in each of Production Examples 2-1 to 2-4 was used to produce an injection-molded article by use of an injection molding machine (manufactured by Sumitomo Heavy Industries, Ltd., Model: SE130DU-HP) under temperature conditions of a cylinder temperature of 230 to 260° C. and a mold temperature of 60° C.

The evaluation results of the injection-molded article obtained are shown in Table 4.

Comparative Examples 2-2 to 2-3

A polyester resin containing no diol unit having a pentacyclopentadecane backbone: Tritan (TX1001: produced by Eastman Chemical Company) or an acrylonitrile-styrene copolymer: Stylac AS (T8707: produced by Asahi Kasei Chemicals Corporation) was used to produce an injection-molded article by use of an injection molding machine (manufactured by Sumitomo Heavy Industries, Ltd., Model: SE130DU-HP) under temperature conditions of a cylinder temperature of 230 to 260° C. and a mold temperature of 60° C.

The evaluation results of the resin used and the injection-molded article obtained are shown in Table 5.

Comparative Example 2-4

PSJ-polystyrene (HF77: produced by PS Japan Corporation) was used to produce an injection-molded article by use of an injection molding machine (manufactured by Sumitomo Heavy Industries, Ltd., Model: SE130DU-HP) under temperature conditions of a cylinder temperature of 210 to 230° C. and a mold temperature of 60° C.

The evaluation results of the resin used and the injection-molded article obtained are shown in Table 5.

TABLE 3

|  |  | Production Example 2-1 | Production Example 2-2 | Production Example 2-3 | Production Example 2-4 |
|---|---|---|---|---|---|
| Synthesis of polyester resin Amount of monomer loaded (mol) | | | | | |
| Dicarboxylic add or dicarboxylic acid ester | PTA | 10.262 | 8.512 | 12.384 | 0 |
|  | NDCM | 0 | 0 | 0 | 10.193 |
| Diol | PCPDM | 5.131 | 6.810 | 3.096 | 2.650 |
|  | EG | 7.697 | 3.831 | 12.384 | 15.697 |
| Amounts of catalyst and additive loaded (×10$^{-3}$ mol) | | | | | |
| Manganese(II) acetate tetrahydrate | | 0 | 0 | 0 | 4.587 |
| Antimony(III) oxide | | 1.539 | 1.277 | 1.858 | 1.529 |
| Phosphoric acid | | 4.105 | 6.980 | 4.953 | 6.931 |
| Evaluation results (polyester resin) | | | | | |
| Copolymerization composition (% by mol) | PTA | 100 | 100 | 100 | 0 |
|  | NDCM | 0 | 0 | 0 | 100 |
|  | PCPDM | 47 | 75 | 23 | 23 |
|  | EG | 52 | 24 | 76 | 75 |
|  | DEG | 1 | 1 | 1 | 2 |

Herein, abbreviations in the Table are as follows.
PTA: high-purity terephthalic acid
NDCM: dimethyl 2,6-naphthalenedicarboxylate
PCPDM: pentacyclopentadecane dimethanol
EG: ethylene glycol
DEG: diethylene glycol

TABLE 4

|  | Reference Example 2-1 | Reference Example 2-1 | Reference Example 2-2 | Comparative Example 2-1 |
|---|---|---|---|---|
| Evaluation results (polyester resin) | | | | |
| Glass transition temperature (Tg) (° C.) | 155 | 130 | 140 | 104 |
| Amount of heat of a crystallization exothermic peak in temperature drop (Δ Hc) (J/g) | 0 | 0 | 0 | 0 |
| Intrinsic viscosity (IV) (dl/g) | 0.49 | 0.54 | 0.45 | 0.63 |
| Production of injection-molded article | | | | |
| Raw material resin | Production Example 2-2 | Production Example 2-1 | Production Example 2-4 | Production Example 2-3 |
| Evaluation results (injection-molded article) | | | | |
| Deflection temperature under load (0.45 MPa) (° C.) | 141 | 114 | 123 | 92 |
| Deflection temperature under load (1.80 MPa) (° C.) | 124 | 100 | 105 | 78 |
| Total light transmittance (3.2 mm) (%) | 84 | 82 | 84 | 85 |
| Haze (3.2 mm) (%) | 5.7 | 6.6 | 2.5 | 5.7 |
| Boiling resistance | | | | |
| Rate of change in dimension in thickness direction (average of measurements at 9 points) (%) | 0.1 | 0.1 | 0.3 | 1.6 |
| Rate of change in dimension in width direction (average of measurements at 9 points) (%) | 0.1 | 0.3 | 0.1 | 0.4 |
| Rate of change in dimension in entire length direction (%) | 0.0 | 0.0 | 0.0 | 1.5 |
| Change in appearance | None | None | None | Warpage occurred |

TABLE 5

|  | Comparative Example 2-2 | Comparative Example 2-3 | Comparative Example 2-4 |
| --- | --- | --- | --- |
| Product name and grade | Tritan (TX1001) | Stylac AS (T8707) | PSJ-Polystyrene (HF77) |
| Evaluation results (resin) | | | |
| Glass transition temperature (Tg) (° C.) | 112 | 108 | 98 |
| Amount of heat of a crystallization exothermic peak in temperature drop (Δ Hc) (J/g) | 0 | 0 | 0 |
| Intrinsic viscosity (IV) (dl/g) | 0.77 | 1.07 | 0.64 |
| Evaluation results (injection-molded article) | | | |
| Deflection temperature under load (0.45 MPa) (° C.) | 94 | 94 | 88 |
| Deflection temperature under load (1.80 MPa) (° C.) | 80 | 84 | 79 |
| Total light transmittance (3.2 mm) (%) | 90 | 91 | 91 |
| Haze (3.2 mm) (%) | 0.7 | 0.5 | 0.9 |
| Boiling resistance | | | |
| Rate of change in dimension in thickness direction (average of measurements at 9 points) (%) | 0.9 | 3.0 | 9.4 |
| Rate of change in dimension in width direction (average of measurements at 9 points) (%) | 0.3 | 1.2 | 4.5 |
| Rate of change in dimension in entire length direction (%) | 0.7 | 3.6 | 11.3 |
| Change in appearance | Warpage occurred | Warpage occurred, large contraction (entire length) | Warpage occurred, large contraction (entire length), slight whitening |

[Synthesis of Polyester Resin]

Production Examples 3-1

Raw material monomers in amounts described in Table 6 were loaded to a polyester production apparatus equipped with a partial condenser, a total condenser, a cold trap, a stirrer, a heating apparatus and a nitrogen introduction tube, and heated to 245 to 260° C. under a nitrogen pressure of 0.3 MPa to perform an esterification reaction. After the reaction conversion of the dicarboxylic acid component, calculated from the amount of water distilled out from a reactor, reached 90% or more, antimony(III)oxide and phosphoric acid were added in amounts described in Table 6, temperature rise and pressure reduction were gradually performed, and polycondensation was finally performed at 260 to 280° C. and 0.1 kPa or less. Once a proper melt viscosity was achieved, the reaction was terminated to recover a polyester resin.

The composition and the evaluation results of the polyester resin obtained are shown in Table 6 and Table 7, respectively.

Production Example 3-2

Raw material monomers and manganese(II)acetate tetrahydrate in amounts described in Table 6 were loaded to a polyester production apparatus equipped with a partial condenser, a total condenser, a cold trap, a stirrer, a heating apparatus and a nitrogen introduction tube, and heated to 220 to 235° C. to perform a transesterification reaction. After the reaction conversion of the dicarboxylic acid ester component, calculated from the amount of methanol distilled out from a reactor, reached 90% or more, antimony(III)oxide and phosphoric acid were added in amounts described in Table 6, temperature rise and pressure reduction were gradually performed, and polycondensation was finally performed at 260 to 280° C. and 0.1 kPa or less. Once a proper melt viscosity was achieved, the reaction was terminated to recover a polyester resin.

The composition and the evaluation results of the polyester resin obtained are shown in Table 6 and Table 7, respectively.

[Production of Sheet and Sheet Molded Article]

Example 3-1

The polyester resin obtained in Production Example 3-1 was loaded to a sheet production apparatus including an extruder (manufactured by PULAENG CO., LTD., trade name: PSV-30 (bore diameter: 30 mm, L/D=36)), a T die, a cooling roll and a winding machine, to produce each of a sheet having a thickness of about 0.20 mm and a sheet having a thickness of about 0.35 mm by a T die method.

The sheet having a thickness of about 0.20 mm was molded under conditions of a cylinder temperature of 240° C., a die temperature of 250° C., a screw rotation speed of 35 to 36 rpm, roll speeds (main roll speed, pinch roll speed) of 1.0 to 1.1 m/min and a roll temperature of 145° C.

The sheet having a thickness of about 0.35 mm was molded in the same conditions as in the sheet having a thickness of about 0.20 mm except that the roll speeds (main roll speed, pinch roll speed) were changed to 0.6 to 0.8 m/min.

Furthermore, the polyester sheet having a thickness of about 0.35 mm was subjected to thermal molding by use of a compressed air vacuum molding machine (manufactured by Asano Lab., Model: FK-0431-10), to produce a molded article (container) (drawing ratio=1.8) having an opening of 70 mm×70 mm, a height of 25 mm and a volume of about 100 mL. Thermal molding was performed using a plug-assist method (upper die: compressed air/lower die: vacuum) as the thermal molding system under thermal molding conditions of a sheet preheating temperature of 180° C., a mold temperature of 60° C. and a compressed air pressure of 4 kg/cm$^2$.

The evaluation results of the sheet and the sheet molded article obtained are shown in Table 7.

Reference Example 3-1

The polyester resin obtained in Production Example 3-2 was loaded to a sheet production apparatus including an extruder (manufactured by PULAENG CO., LTD., trade name: PSV-30 (bore diameter: 30 mm, L/D=36)), a T die, a cooling roll and a winding machine, to produce each of a sheet having a thickness of about 0.20 mm and a sheet having a thickness of about 0.35 mm by a T die method.

The sheet having a thickness of about 0.20 mm was molded under conditions of a cylinder temperature of 240° C., a die temperature of 250° C., a screw rotation speed of 32 to 33 rpm, roll speeds (main roll speed, pinch roll speed) of 1.0 to 1.1 m/min and a roll temperature of 125° C.

The sheet having a thickness of about 0.35 mm was molded in the same conditions as in the sheet having a thickness of about 0.20 mm except that the roll speeds (main roll speed, pinch roll speed) were changed to 0.7 to 0.8 m/min.

Furthermore, the polyester sheet having a thickness of about 0.35 mm was subjected to thermal molding by use of a compressed air vacuum molding machine (manufactured by Asano Lab., Model: FK-0431-10), to produce a molded article (container) (drawing ratio=1.8) having an opening of 70 mm×70 mm, a height of 25 mm and a volume of about 100 mL. Thermal molding was performed using a plug-assist method (upper die: compressed air/lower die: vacuum) as the thermal molding system under thermal molding conditions of a sheet preheating temperature of 170° C., a mold temperature of 60° C. and a compressed air pressure of 4 kg/cm$^2$.

The evaluation results of the sheet and the sheet molded article obtained are shown in Table 7.

Comparative Example 3-1

A polyester resin containing no diol unit having a pentacyclopentadecane backbone: Tritan (TX1001) (produced by Eastman Chemical Company) was loaded to a sheet production apparatus including an extruder (manufactured by PULAENG CO., LTD., trade name: PSV-30 (bore diameter: 30 mm, L/D=36)), a T die, a cooling roll and a winding machine, to produce each of a sheet having a thickness of about 0.20 mm and a sheet having a thickness of about 0.35 mm by a T die method.

The sheet having a thickness of about 0.20 mm was molded under conditions of a cylinder temperature of 250° C., a die temperature of 260° C., a screw rotation speed of 34 to 35 rpm, roll speeds (main roll speed, pinch roll speed) of 1.0 to 1.1 m/min and a roll temperature of 110° C.

The sheet having a thickness of about 0.35 mm was molded in the same conditions as in the sheet having a thickness of about 0.20 mm except that the roll speeds (main roll speed, pinch roll speed) were changed to 0.6 to 0.8 m/min.

Furthermore, the sheet having a thickness of about 0.35 mm was subjected to thermal molding by the same method as in Reference Example 3-1 except that the sheet preheating temperature was 160° C., to produce the same molded article (container) as in Reference Example 3-1.

The evaluation results of the resin, and the sheet and the sheet molded article are shown in Table 8.

Comparative Example 3-2

An acrylonitrile-styrene copolymer: Stylac AS (T8707) (produced by Asahi Kasei Chemicals Corporation) was loaded to a sheet production apparatus including an extruder (manufactured by PULAENG CO., LTD., trade name: PSV-30 (bore diameter: 30 mm, L/D=36)), a T die, a cooling roll and a winding machine, to produce each of a sheet having a thickness of about 0.20 mm and a sheet having a thickness of about 0.35 mm by a T die method.

The sheet having a thickness of about 0.20 mm was molded under conditions of a cylinder temperature of 240° C., a die temperature of 250° C., a screw rotation speed of 33 to 34 rpm, roll speeds (main roll speed, pinch roll speed) of 1.0 to 1.1 m/min and a roll temperature of 103° C.

The sheet having a thickness of about 0.35 mm was molded in the same conditions as in the sheet having a thickness of about 0.20 mm except that the roll speeds (main roll speed, pinch roll speed) were changed to 0.6 to 0.7 m/min.

Furthermore, the sheet having a thickness of about 0.35 mm was subjected to thermal molding by the same method as in Reference Example 3-1 except that the mold temperature was 30° C. and the compressed air pressure was 1 kg/cm$^2$, to produce the same molded article (container) as in Reference Example 3-1.

The evaluation results of the resin, and the sheet and the sheet molded article are shown in Table 8.

Comparative Example 3-3

PSJ-polystyrene (HF77) (produced by PS Japan Corporation) was loaded to a sheet production apparatus including an extruder (manufactured by PULAENG CO., LTD., trade name: PSV-30 (bore diameter: 30 mm, L/D=36)), a T die, a cooling roll and a winding machine, to produce each of a sheet having a thickness of about 0.20 mm and a sheet having a thickness of about 0.35 mm by a T die method.

The sheet having a thickness of about 0.20 mm was molded under conditions of a cylinder temperature of 230° C., a die temperature of 240° C., a screw rotation speed of 33 to 34 rpm, roll speeds (main roll speed, pinch roll speed) of 1.0 to 1.1 m/min and a roll temperature of 96° C.

The sheet having a thickness of about 0.35 mm was molded in the same conditions as in the sheet having a thickness of about 0.20 mm except that the roll speeds (main roll speed, pinch roll speed) were changed to 0.7 to 0.8 m/min.

Furthermore, the sheet having a thickness of about 0.35 mm was subjected to thermal molding by the same method as in Reference Example 3-1 except that the sheet preheating temperature was 160° C., the mold temperature was 30° C. and the compressed air pressure was 1 kg/cm$^2$, to produce the same molded article (container) as in Reference Example 3-1.

The evaluation results of the resin, and the sheet and the sheet molded article are shown in Table 8.

TABLE 6

|  |  | Production Example 3-1 | Production Example 3-2 |
|---|---|---|---|
| Synthesis of polyester resin |  |  |  |
| Amount of monomer loaded (mol) |  |  |  |
| Dicarboxylic acid/dicarboxylic acid ester | PTA | 8.512 | — |
|  | DMT | — | 61.573 |
| Diol | PCPDM | 6.810 | 30.787 |
|  | EG | 3.831 | 80.045 |
| Amounts of catalyst and additive loaded (×10$^{-3}$ mol) |  |  |  |
| Manganese(II) acetate tetrahydrate |  | — | 27.708 |
| Antimony(III) oxide |  | 1.277 | 9.236 |
| Phosphoric acid |  | 6.980 | 41.254 |

TABLE 6-continued

|  |  | Production Example 3-1 | Production Example 3-2 |
|---|---|---|---|
| Evaluation results (polyester resin) |  |  |  |
| Copolymerization composition (% by mol) | PTA | 100 | — |
|  | DMT | — | 100 |
|  | PCPDM | 74 | 47 |
|  | EG | 24 | 52 |
|  | DEG | 2 | 1 |

Herein, abbreviations in the Table are as follows.
PTA: high-purity terephthalic acid
DMT: dimethyl terephthalate
PCPDM: pentacyclopentadecane dimethanol
EG: ethylene glycol
DEG: diethylene glycol

TABLE 7

|  | Example 3-1 | Reference Example 3-1 |
|---|---|---|
| Evaluation results (polyester resin) |  |  |
| Glass transition temperature (Tg) (° C.) | 152 | 131 |
| Amount of heat of a crystallization exothermic peak in temperature drop (Δ Hc) (J/g) | 0 | 0 |
| Intrinsic viscosity (IV) (dl/g) | 0.45 | 0.56 |
| Production of polyester sheet |  |  |
| Raw material resin | Production Example 3-1 | Production Example 3-2 |
| Evaluation results (polyester sheet) |  |  |
| Total light transmittance (%/0.20 mm) | 91 | 91 |
| Total light transmittance (%/0.35 mm) | 90 | 91 |
| Haze (%/0.20 mm) | 2.5 | 0.9 |
| Haze (%/0.35 mm) | 3.1 | 0.7 |
| Heat resistance temperature | 150 | 120 |
| Evaluation results (sheet molded article) |  |  |
| Transparency | ○ | ○ |
| Heat resistance temperature | 140 | 115 |

TABLE 8

|  | Comparative Example 3-1 | Comparative Example 3-2 | Comparative Example 3-3 |
|---|---|---|---|
| Product name and grade | Tritan (TX1001) | Stylac AS (T8707) | PSJ-Polystyrene (HF77) |
| Evaluation results (resin) |  |  |  |
| Glass transition temperature (Tg) (° C.) | 112 | 108 | 98 |
| Amount of heat of a crystallization exothermic peak in temperature drop (Δ Hc) (J/g) | 0 | 0 | 0 |
| Intrinsic viscosity (IV) (dl/g) | 0.77 | 1.07 | 0.64 |
| Evaluation results (sheet) |  |  |  |
| Total light transmittance (%/0.20 mm) | 92 | 91 | 91 |
| Total light transmittance (%/0.35 mm) | 92 | 92 | 91 |
| Haze (%/0.20 mm) | 0.9 | 0.6 | 0.7 |
| Haze (%/0.35 mm) | 0.5 | 0.8 | 1.2 |
| Heat resistance temperature | 105 | 105 | 90 |
| Evaluation results (sheet molded article) |  |  |  |
| Transparency | ○ | ○ | ○ |
| Heat resistance temperature | 95 | 95 | 90 |

[Synthesis of Polyester Resin]

Production Examples 4-1

Raw material monomers in amounts described in Table 9 were loaded to a polyester production apparatus equipped with a partial condenser, a total condenser, a cold trap, a stirrer, a heating apparatus and a nitrogen introduction tube, and heated to 245 to 260° C. under a nitrogen pressure of 0.3 MPa to perform an esterification reaction. After the reaction conversion of the dicarboxylic acid component, calculated from the amount of water distilled out from a reactor, reached 90% or more, antimony (III) oxide and phosphoric acid were added in amounts described in Table 9, temperature rise and pressure reduction were gradually performed, and polycondensation was finally performed at 260 to 280° C. and 0.1 kPa or less. Once a proper melt viscosity was achieved, the reaction was terminated to recover a polyester resin.

The composition and the evaluation results of the polyester resin obtained are shown in Table 9 and Table 10, respectively.

Production Example 4-2

Raw material monomers and manganese(II)acetate tetrahydrate in amounts described in Table 9 were loaded to a polyester production apparatus equipped with a partial condenser, a total condenser, a cold trap, a stirrer, a heating apparatus and a nitrogen introduction tube, and heated to 220 to 235° C. to perform a transesterification reaction. After the reaction conversion of the dicarboxylic acid ester component, calculated from the amount of methanol distilled out from a reactor, reached 90% or more, antimony(III)oxide and phosphoric acid were added in amounts described in Table 9, temperature rise and pressure reduction were gradually performed, and polycondensation was finally performed at 260 to 280° C. and 0.1 kPa or less. Once a proper melt viscosity was achieved, the reaction was terminated to recover a polyester resin.

The composition and the evaluation results of the polyester resin obtained are shown in Table 9 and Table 10, respectively.

[Production of Raw Sheet and Container]

Example 4-1

The polyester resin obtained in Production Example 4-1 was loaded to a sheet production apparatus including an extruder (manufactured by PULAENG CO., LTD., trade name: PSV-30 (bore diameter: 30 mm, L/D=36)), a T die, a cooling roll and a winding machine, to produce a sheet having a thickness of about 0.35 mm by a T die method.

Molding was performed under conditions of a cylinder temperature of 240° C., a die temperature of 250° C., a screw rotation speed of 35 to 36 rpm, roll speeds (main roll speed, pinch roll speed) of 0.6 to 0.8 m/min and a roll temperature of 145° C.

Next, the polyester sheet was subjected to thermal molding by use of a compressed air vacuum molding machine (manufactured by Asano Lab., Model: FK-0431-10), to produce a molded article (container) (drawing ratio=0.36) having a cross-sectional shape illustrated in FIG. 5 and having an opening of 70 mm×70 mm, a height of 25 mm and a volume of about 100 mL.

Thermal molding was performed using a plug-assist method (upper die: compressed air/lower die: vacuum) as the thermal molding system under thermal molding conditions of a sheet preheating temperature of 180° C., a mold temperature of 60° C. and a compressed air pressure of 4 kg/cm².

The evaluation results of the container obtained are shown in Table 10.

Reference Example 4-1

The polyester resin obtained in Production Example 4-2 was loaded to a sheet production apparatus including an extruder (manufactured by PULAENG CO., LTD., trade name: PSV-30 (bore diameter: 30 mm, L/D=36)), a T die, a cooling roll and a winding machine, to produce a sheet having a thickness of about 0.35 mm by a T die method.

Molding was performed under conditions of a cylinder temperature of 240° C., a die temperature of 250° C., a screw rotation speed of 32 to 33 rpm, roll speeds (main roll speed, pinch roll speed) of 0.7 to 0.8 m/min and a roll temperature of 125° C.

Next, the polyester sheet was subjected to thermal molding by use of a compressed air vacuum molding machine (manufactured by Asano Lab., Model: FK-0431-10), to produce a molded article (container) (drawing ratio=0.36) having a cross-sectional shape illustrated in FIG. 5 and having an opening of 70 mm×70 mm, a height of 25 mm and a volume of about 100 mL.

Thermal molding was performed using a plug-assist method (upper die: compressed air/lower die: vacuum) as the thermal molding system under thermal molding conditions of a sheet preheating temperature of 170° C., a mold temperature of 60° C. and a compressed air pressure of 4 kg,/cm².

The evaluation results of the container obtained are shown in Table 10.

Comparative Example 4-1

A polyester resin containing no diol unit having a pentacyclopentadecane backbone: Tritan (TX1001) (produced by Eastman Chemical Company) was loaded to a sheet production apparatus including an extruder (manufactured by PULAENG CO., LTD., trade name: PSV-30 (bore diameter: 30 mm, L/D=36)), a T die, a cooling roll and a winding machine, to produce a sheet having a thickness of about 0.35 mm by a T die method.

Molding was performed under conditions of a cylinder temperature of 250° C., a die temperature of 260° C., a screw rotation speed of 34 to 35 rpm, roll speeds (main roll speed, pinch roll speed) of 0.6 to 0.8 m/min and a roll temperature of 110° C.

Furthermore, the sheet was subjected to thermal molding by the same method as in Reference Example 4-1 except that the sheet preheating temperature was 160° C., to produce the same molded article (container) as in Reference Example 4-1.

The evaluation results of the resin and the container are shown in Table 11.

Comparative Example 4-2

An acrylonitrile-styrene copolymer: Stylac AS (T8707) (produced by Asahi Kasei Chemicals Corporation) was loaded to a sheet production apparatus including an extruder (manufactured by PULAENG CO., LTD., trade name: PSV-30 (bore diameter: 30 mm, L/D=36)), a T die, a cooling roll and a winding machine, to produce a sheet having a thickness of about 0.35 mm by a T die method.

Molding was performed under conditions of a cylinder temperature of 240° C., a die temperature of 250° C., a screw rotation speed of 33 to 34 rpm, roll speeds (main roll speed, pinch roll speed) of 0.6 to 0.7 m/min and a roll temperature of 103° C.

Furthermore, the sheet was subjected to thermal molding by the same method as in Reference Example 4-1 except that the mold temperature was 30° C. and the compressed air pressure was 1 kg/cm², to produce the same molded article (container) as in Reference Example 4-1.

The evaluation results of the resin and the container are shown in Table 11.

Comparative Example 4-3

PSJ-polystyrene (HF77) (produced by PS Japan Corporation) was loaded to a sheet production apparatus including an extruder (manufactured by PULAENG CO., LTD., trade name: PSV-30 (bore diameter: 30 mm, L/D=36)), a T die, a cooling roll and a winding machine, to produce a sheet having a thickness of about 0.35 mm by a T die method.

Molding was performed under conditions of a cylinder temperature of 230° C., a die temperature of 240° C., a screw rotation speed of 33 to 34 rpm, roll speeds (main roll speed, pinch roll speed) of 0.7 to 0.8 m/min and a roll temperature of 96° C.

Furthermore, the sheet was subjected to thermal molding by the same method as in Reference Example 4-1 except that the sheet preheating temperature was 160° C., the mold temperature was 30° C. and the compressed air pressure was 1 kg/cm², to produce the same molded article (container) as in Reference Example 4-1.

The evaluation results of the resin and the container are shown in Table 11.

TABLE 9

|  |  | Production Example 4-1 | Production Example 4-2 |
|---|---|---|---|
| Synthesis of polyester resin Amount of monomer loaded (mol) | | | |
| Dicarboxylic acid/dicarboxylic acid ester | PTA | 8.512 | — |
|  | DMT | — | 61.573 |

TABLE 9-continued

|  |  | Production Example 4-1 | Production Example 4-2 |
|---|---|---|---|
| Diol | PCPDM | 6.810 | 30.787 |
|  | EG | 3.831 | 80.045 |
| Amounts of catalyst and additive loaded (×10⁻³ mol) | | | |
| Manganese(II) acetate tetrahydrate | | — | 27.708 |
| Antimony(III) oxide | | 1.277 | 9.236 |
| Phosphoric acid | | 6.980 | 41.254 |
| Evaluation results (polyester resin) | | | |
| Copolymerization composition (% by mol) | PTA | 100 | — |
|  | DMT | — | 100 |
|  | PCPDM | 74 | 47 |
|  | EG | 24 | 52 |
|  | DEG | 2 | 1 |

Herein, abbreviations in the Table are as follows.
PTA: high-purity terephthalic acid
DMT: dimethyl terephthalate
PCPDM: pentacyclopentadecane dimethanol
EG: ethylene glycol
DEG: diethylene glycol

TABLE 10

|  | Example 4-1 | Reference Example 4-1 |
|---|---|---|
| Evaluation results (polyester resin) | | |
| Glass transition temperature (Tg) (° C.) | 152 | 131 |
| Amount of heat of a crystallization exothermic peak in temperature drop (Δ Hc) (J/g) | 0 | 0 |
| Intrinsic viscosity (IV) (dl/g) | 0.45 | 0.56 |
| Production of polyester container | | |
| Raw material resin | Production Example 4-1 | Production Example 4-2 |
| Evaluation results (polyester container) | | |
| Transparency | ○ | ○ |
| Heat resistance temperature | 140 | 115 |

TABLE 11

|  | Comparative Example 4-1 | Comparative Example 4-2 | Comparative Example 4-3 |
|---|---|---|---|
| Product name and grade | Tritan (TX1001) | Stylac AS (T8707) | PSJ-Polystyrene (HF77) |
| Evaluation results (resin) | | | |
| Glass transition temperature (Tg) (° C.) | 112 | 108 | 98 |
| Amount of heat of a crystallization exothermic peak in temperature drop (Δ Hc) (J/g) | 0 | 0 | 0 |
| Intrinsic viscosity (IV) (dl/g) | 0.77 | 1.07 | 0.64 |
| Evaluation results (container) | | | |
| Transparency | ○ | ○ | ○ |
| Heat resistance temperature | 95 | 95 | 90 |

The present application is based on Japanese Patent Application (Japanese Patent Application No. 2013-213322) filed on Oct. 11, 2013, Japanese Patent Application (Japanese Patent Application No. 2013-213323) filed on Oct. 11, 2013, Japanese Patent Application (Japanese Patent Application No. 2013-213324) filed on Oct. 11, 2013 and Japanese Patent Application (Japanese Patent Application No. 2013-213325) filed on Oct. 11, 2013, the contents of which are herein incorporated by reference.

INDUSTRIAL APPLICABILITY

The polyester resin of the present invention can be used in various applications. For example, the polyester resin is transparent and has heat resistance so that it can withstand a heat treatment at 100° C. or higher, and therefore can be suitably utilized in applications such as a food container, a cosmetic container, a medical instrument, and baby products such as a baby bottle and a pacifier. Furthermore, the polyester resin can also be utilized in applications where it is used under a severe temperature condition, such as an electronic material and an automobile component.

In addition, the injection-molded article of the present invention can be used in various applications. For example, the injection-molded article is transparent and has heat resistance so that it can withstand boiling disinfection, and therefore can be suitably utilized in applications where a high-temperature sterilization treatment is required, such as food/beverage containers, a cosmetic container, a medical instrument, and baby products such as a baby bottle and a pacifier. Furthermore, the injection-molded article can also be utilized in applications where it is used under a severe temperature condition, such as an electronic material and an automobile component.

Furthermore, the polyester sheet of the present invention, and the molded article obtained by subjecting the sheet to molding can be used in food applications such as a transparent container required to be sterilized and pasteurized, a heat resistant transparent cup for beverages, a prepared food tray, a transparent container required to be re-heated, and a lid material. In addition, the polyester sheet can be used in building material applications, for example, exterior applications such as a showcase, an outdoor signage and a carport, various industrial covers, a protection against wind, and a partition panel. The polyester sheet can be used in other fields such as a label, a seal, a tape, a display, clear case/clear box (folded molded product), an automobile component, an electronic material, a lighted panel for vending machines, a light cover, a blister, and a packaging material for products to be exported beyond the equator.

Moreover, the polyester container of the present invention can be utilized as a transparent container that can be applied to, for example, storage of a high-temperature product, heating for sterilization and cooking, packing of contents at high temperatures, and transport under a high temperature environment. The container produced by hollow molding can be used in, for example, a bottle for storing foods and beverages such as a tea, a juice, a soft drink, a dressing, a sauce, a honey and a jam, a bottle for storing toiletry products such as cosmetics, a body care product, a shampoo and a detergent, and a bottle for drugs and medicines. The container produced by thermal molding of the sheet can be used in, for example, tray/cup for storing foods such as a jelly, a pudding, a baby food, a prepared food and an instant food, a cup for beverages, a medical tray, a lid material, a blister pack, a clear case, and a carrier tape.

From the foregoing, the present invention is highly significant in industries.

The invention claimed is:

1. A polyester resin comprising a diol unit and a dicarboxylic acid unit, wherein 5 to 50% by mol of the diol unit is a unit derived from ethylene glycol and 50 to 95% by mol of the diol unit is a unit derived from pentacyclopentadecane dimethanol represented by the following formula (I) and/or pentacyclopentadecane dimethanol represented by the following formula (II),

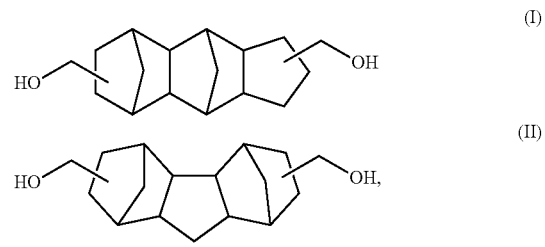

50 to 100% by mol of the dicarboxylic acid unit is a unit derived from an aromatic dicarboxylic acid, and both of the following conditions (1) and (2) are satisfied:
(1) a measurement value of a glass transition temperature measured by a differential scanning calorimeter is 131° C. or higher, and an amount of heat of a crystallization exothermic peak in temperature drop is 5 J/g or less; and
(2) a measurement value of an intrinsic viscosity (IV) at 25° C. using a mixed solvent of phenol and 1,1,2,2-tetrachloroethane in a mass ratio of 6:4 is 0.2 to 1.2 dl/g.

2. The polyester resin according to claim 1, wherein the unit derived from the aromatic dicarboxylic acid is a unit derived from at least one selected from the group consisting of terephthalic acid, isophthalic acid and 2,6-naphthalenedicarboxylic acid.

3. The polyester resin according to claim 1, wherein 80 to 100% by mol of the dicarboxylic acid unit is the unit derived from the aromatic dicarboxylic acid.

4. An injection-molded article obtained from the polyester resin according to claim 1.

5. The injection-molded article according to claim 4, wherein 50 to 90% by mol of the diol unit of the polyester resin is the unit derived from the pentacyclopentadecane dimethanol represented by the formula (I) and/or the pentacyclopentadecane dimethanol represented by the formula (II), 10 to 50% by mol of the diol unit of the polyester resin is a unit derived from ethylene glycol, and 70 to 100% by mol of the dicarboxylic acid unit of the polyester resin is a unit derived from terephthalic acid.

6. The injection-molded article according to claim 4, wherein 5 to 50% by mol of the diol unit of the polyester resin is a unit derived from ethylene glycol, and 70 to 100% by mol of the dicarboxylic acid unit of the polyester resin is a unit derived from 2,6-naphthalenedicarboxylic acid.

7. The injection-molded article according to claim 4, wherein the polyester resin satisfies the following condition (3):
(3) when a test piece (1A type multi-purpose test piece) having a shape described in JIS K7162 (tensile property testing method), obtained by subjecting the polyester resin to injection molding, is immersed in boiling water at 100° C. for 30 minutes, a rate of dimensional change after immersion in boiling water, calculated from the following formula (1), is 0.50% or less in each of a thickness direction and a width direction, and 0.60% or less in an entire length direction:

$$\Delta M = |M - M_0|/M_0 \times 100 \qquad \text{Formula (1)}$$

wherein $\Delta M$ represents the rate of dimensional change represented as a percent, $M_0$ represents a dimension, in millimeters, before immersion in boiling water, and M represents a dimension, in millimeters, after immersion in boiling water.

8. A polyester sheet obtained by subjecting the polyester resin according to claim 1 to molding.

9. The polyester sheet according to claim 8, wherein 50 to 90% by mol of the diol unit of the polyester resin is the unit derived from the pentacyclopentadecane dimethanol represented by the formula (I) and/or the pentacyclopentadecane dimethanol represented by the formula (II), 10 to 50% by mol of the diol unit of the polyester resin is a unit derived from ethylene glycol, and 70 to 100% by mol of the dicarboxylic acid unit of the polyester resin is a unit derived from terephthalic acid.

10. The polyester sheet according to claim 8, wherein 5 to 50% by mol of the diol unit of the polyester resin is a unit derived from ethylene glycol, and 70 to 100% by mol of the dicarboxylic acid unit of the polyester resin is a unit derived from 2,6-naphthalenedicarboxylic acid.

11. The polyester sheet according to claim 8, wherein the polyester resin satisfies the following conditions (4) and (5):
(4) a measurement value of a total light transmittance of each of a sheet having a thickness of 0.20 mm and a sheet having a thickness of 0.35 mm is 86% or more; and
(5) when a square test piece of a size of 120 mm in longitudinal length ×120 mm in lateral width, where an extrusion direction is defined as a longitudinal direction and a width direction is defined as a lateral direction, is cut out from the sheet having the thickness of 0.20 mm and a marked line having a length of 100 mm is signed on a center line in each of the longitudinal direction and the lateral direction of the test piece, and the test piece is heated in a dryer for 30 minutes, a maximum temperature (heat resistance temperature), at which a rate of change in the marked line length after heating, calculated from the following formula (2), is not more than 0.5% in each of the longitudinal length and the lateral width, is 110° C. or higher:

$$\Delta L = |L - L_0|/L_0 \times 100 \qquad \text{Formula (2)}$$

wherein $\Delta L$ represents the rate of change in the marked line length represented as a percent, $L_0$ represents a marked line length, in millimeters, before heating, and L represents a marked line length, in millimeters, after heating.

12. A polyester container obtained by subjecting the polyester resin according to claim 1 to molding.

13. The polyester container according to claim 12, wherein 50 to 90% by mol of the diol unit of the polyester resin is the unit derived from the pentacyclopentadecane dimethanol represented by the formula (I) and/or the pentacyclopentadecane dimethanol represented by the formula (II), 10 to 50% by mol of the diol unit of the polyester resin is a unit derived from ethylene glycol, and 70 to 100% by mol of the dicarboxylic acid unit of the polyester resin is a unit derived from terephthalic acid.

14. The polyester container according to claim 12, wherein 5 to 50% by mol of the diol unit of the polyester resin is a unit derived from ethylene glycol, and 70 to 100% by mol of the dicarboxylic acid unit of the polyester resin is a unit derived from 2,6-naphthalenedicarboxylic acid.

15. The polyester container according to claim 12, wherein the polyester container satisfies the following condition (6):
(6) when a polyester container having the following shape is heated in a dryer for 30 minutes, a maximum temperature (heat resistance temperature), at which a height retention rate of a container after heating, calculated from the following formula (3), is 98% or more, is 100° C. or higher;
wherein the container is a container having an opening of 70 mm×70 mm, a height of 25 mm and a volume of about 100 mL, obtained by subjecting a polyester sheet having a thickness of 0.35 mm to thermal molding at a drawing ratio of 0.36 by use of a compressed air vacuum molding machine;

$$\Delta H = H/H_0 \times 100 \qquad \text{Formula (3)}$$

wherein $\Delta H$ represents the height retention rate of the container represented as a percent, $H_0$ represents a height, in millimeters, of the container before heating, and H represents a height, in millimeters, of the container after heating.

16. The polyester container according to claim 12, wherein the molding is hollow molding of the polyester resin.

17. The polyester container according to claim 12, wherein the molding is thermal molding of a sheet comprising the polyester resin.

* * * * *